US011682061B2

United States Patent
Saunkeah et al.

(10) Patent No.: US 11,682,061 B2
(45) Date of Patent: Jun. 20, 2023

(54) SYSTEM, METHOD, AND NON-TRANSITORY COMPUTER-READABLE STORAGE MEDIUM FOR DYNAMICALLY DEFINABLE GIFT OBJECTS

(71) Applicant: Loop Commerce, Inc., Stamford, CT (US)

(72) Inventors: Gabriel Saunkeah, Berkeley, CA (US); Shane Parrish, Menlo Park, CA (US); Deny Chen, Fremont, CA (US); Roman Boudagov, Cupertino, CA (US); Andres Mendez, Austin, TX (US); Cherry Wee, Mountain View, CA (US)

(73) Assignee: LOOP COMMERCE, INC., Stamford, CT (US)

( * ) Notice: Subject to any disclaimer, the term of this patent is extended or adjusted under 35 U.S.C. 154(b) by 0 days.

(21) Appl. No.: 17/813,081

(22) Filed: Jul. 18, 2022

(65) Prior Publication Data
US 2023/0029396 A1 Jan. 26, 2023

Related U.S. Application Data

(60) Provisional application No. 63/224,709, filed on Jul. 22, 2021.

(51) Int. Cl.
*G06Q 30/00* (2023.01)
*G06Q 30/0601* (2023.01)
(52) U.S. Cl.
CPC .............. *G06Q 30/0631* (2013.01)
(58) Field of Classification Search
CPC ........................ G06Q 30/0601–0645

USPC ............................. 705/26.1–27.2
See application file for complete search history.

(56) References Cited

U.S. PATENT DOCUMENTS

| 10,679,268 | B1 * | 6/2020 | Kochhar | G06Q 30/0641 |
| 11,367,117 | B1 * | 6/2022 | Cheng | G06Q 30/0631 |
| 2009/0063295 | A1 * | 3/2009 | Smith | G06Q 30/0605 |
| | | | | 705/26.2 |

(Continued)

OTHER PUBLICATIONS

Vanhamme, Joëlle, and Cees de Bont J.P.M. "'Surprise Gift' Purchases: Customer Insights from the Small Electrical Appliances Market." Journal of Retailing 84.3 (2008): 354-69. ProQuest. Web. Oct. 6, 2022. (Year: 2008).*

(Continued)

*Primary Examiner* — Michael Misiaszek
*Assistant Examiner* — Kennedy Gibson-Wynn
(74) *Attorney, Agent, or Firm* — Polsinelli LLP

(57) ABSTRACT

Systems and methods for generating dynamically definable gift objects are provided. A gift service may train a gift object algorithm and a gift selection algorithm using sample datasets. A gift request may be received and the gift service may generate a gift object with an undefined set of gift object using the gift object algorithm. A redemption request may be received and the gift service may generate a custom set of gift selection options using the gift selection algorithm in response to the redemption request. A selection from the custom set of gift selection options may be received and the gift object algorithm and the gift selection algorithm may be updated based on the redemption request, the custom set of gift selection options, and the selection.

21 Claims, 25 Drawing Sheets

(56) References Cited

U.S. PATENT DOCUMENTS

| | | | |
|---|---|---|---|
| 2014/0372251 A1* | 12/2014 | Rodell | G06Q 30/0641 |
| | | | 705/26.7 |
| 2020/0020015 A1* | 1/2020 | Anders | G06Q 10/083 |
| 2020/0034914 A1* | 1/2020 | Boss | G06F 40/30 |
| 2021/0174338 A1* | 6/2021 | Isaacson | G06Q 20/387 |
| 2021/0182976 A1* | 6/2021 | Poslavsky | G06Q 50/14 |

OTHER PUBLICATIONS

Yu, Chao-Ying. "Gift Giving and GiftCard Research." Order No. 3414954 The University of Texas at Dallas, 2010. Ann Arbor: ProQuest. Web. Oct. 6, 2022. (Year: 2010).*

Horne, Daniel Raymond. "An Exploration of Consumer Choices and Choice Processes in Gift Selection." Order No. 9319547 University of Michigan, 1993. Ann Arbor: ProQuest. Web. Jan. 25, 2023. (Year: 1993).*

* cited by examiner

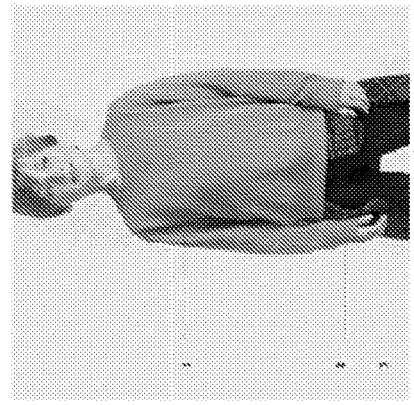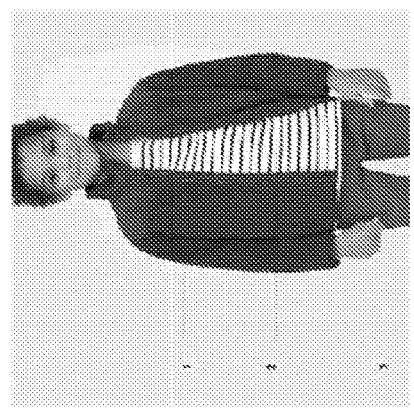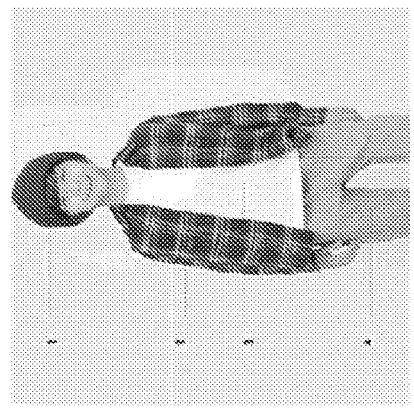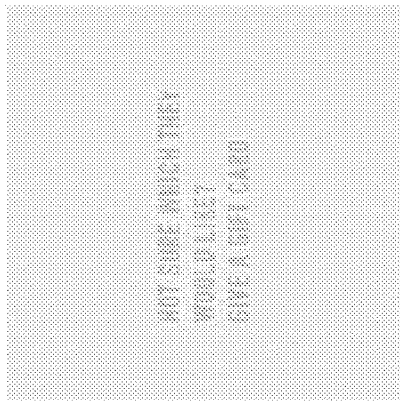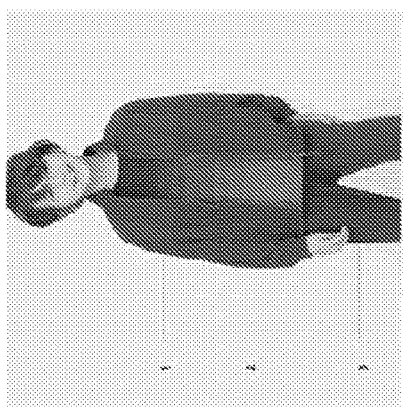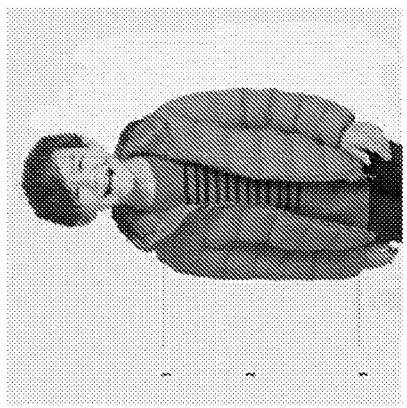
FIG. 15

SYSTEM, METHOD, AND NON-TRANSITORY COMPUTER-READABLE STORAGE MEDIUM FOR DYNAMICALLY DEFINABLE GIFT OBJECTS

CROSS-REFERENCE TO RELATED APPLICATIONS

The present patent application claims the priority benefit of U.S. provisional patent application No. 63/224,709 filed Jul. 22, 2021, the disclosures of which are incorporated by reference herein.

FIELD

The present disclosure relates generally to determining gifts associated with a dynamically definable gift object. In one example, the systems and methods described herein determine whether a dynamically definable gift object is a category gift, a bundled gift, or some other such type of gift. In one example, the systems and methods described herein may be used to define parameters for category gifts of dynamically definable gift objects, generate category gifts for a recipient of that gift object, and iteratively improve the generation of the category gifts based on the actions of the gift recipient with respect to the dynamically definable gift object. In another example, the systems and methods described herein may be used to define parameters for bundled gifts of dynamically definable gift objects, generate bundled gifts for a recipient of that gift object, and iteratively improve the generation of the bundled gifts based on the actions of the gift recipient with respect to the dynamically definable gift object. Further, the systems and methods described herein may be used to automate the presentation of the gifts while minimizing the solicitation of information from the gift recipient or the gift giver.

SUMMARY

Disclosed embodiments may provide a framework to determine gifts associated with a dynamically definable gift object. According to some embodiments, a computer-implemented method is provided. The computer-implemented method comprises receiving a gift request. The gift request includes a purchaser intent, a gift object type, and a gift object value. The computer-implemented method further comprises training a gift object algorithm to generate a gift object. The gift object algorithm is trained using the purchaser intent, the gift object type, and the gift object value. Further, the gift object is generated with an undefined set of gift selection options. The computer-implemented method further comprises providing the gift object. When the gift object is received by a gift recipient, the gift recipient generates a redemption request associated with the gift object. The computer-implemented method further comprises receiving the redemption request associated with the gift object. The computer-implemented method further comprises training a gift selection algorithm to generate a custom set of gift selection options for the gift object. The gift selection algorithm is trained using a set of sample gift objects, corresponding gift selection options generated based on the set of sample gift objects, and gift selections for the set of sample gift objects. Further, the custom set of gift selection options are generated based on the redemption request. The computer-implemented method further comprises receiving a selection of a gift selection option from the custom set of gift selection options. The computer-imple-mented method further comprises updating the gift object algorithm and the gift selection algorithm using the redemption request, the custom set of gift selection options, and the selection of the gift selection option.

In some embodiments, wherein the gift object type corresponds to a bundled gift. The gift object includes a set of gift types associated with the bundled gift. Further, a particular gift selection option associated with the custom set of gift selection options is selected based on a gift type associated with the set of gift types.

In some embodiments, the gift object type corresponds to a category gift. The gift object includes a gift category associated with the category gift. Further, a particular gift selection option associated with the custom set of gift selection options is selected based on the gift category.

In some embodiments, the gift selection option corresponds to a request to exchange a gift associated with the gift object.

In some embodiments, the gift selection option corresponds to a request for a gift card. The request for the gift card corresponds to the gift object value.

In some embodiments, the custom set of gift selection options is generated by applying the gift selection algorithm to a gift availability corresponding to a set of gifts. The gift availability corresponding to the set of gifts is determined in response to the redemption request.

In some embodiments, the computer-implemented method further comprises generating a custom set of backup gift selection options for the gift object using the gift selection algorithm. The custom set of backup gift selection options are generated in response to the redemption request. The computer-implemented method further comprises updating the gift object algorithm and the gift selection algorithm using the custom set of backup gift selection options.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Illustrative embodiments are described in detail below with reference to the following figures.

FIG. 15 shows an illustrative example of an environment in which outfit options for a bundled gift of a dynamically defined gift object are presented in accordance with at least one embodiment;

Figure 1:
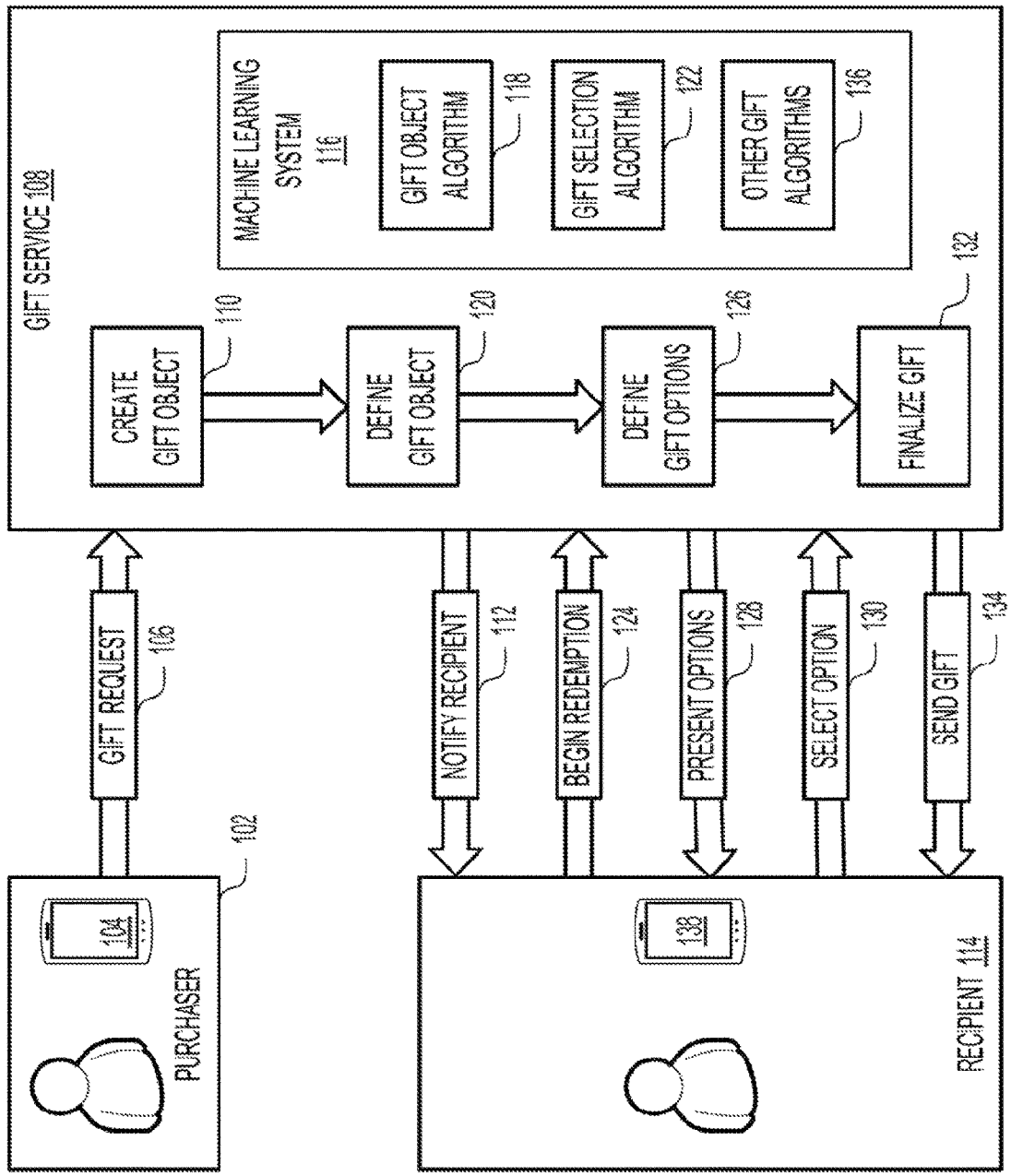
FIG. 1 shows an illustrative example of an environment in which gifts are generated for a dynamically defined gift object in accordance with at least one embodiment.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

Additionally, in the appended figures, similar components and/or features may refer back to an earlier described component. For example, a component and/or feature may be described as " . . . the gift service 208 (which is the same as the gift service 108 described herein at least in connection with FIG. 1) . . . ." Such references are bi-directional in that, a later reference back such as " . . . the gift service 402 (which is the same as the gift service 108 described herein at least in connection with FIG. 1) . . . " is indicative that components and/or features described with respect to the gift service 108 and with respect to the gift service 208 are both incorporated into the components and/or features of the gift service 402 and vice versa.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Gifts sent from a gift purchaser to a gift recipient using, for example, online gift-giving platforms are targeted to consumers where the gift purchaser defines the parameters of the gift at the time of the purchase and the gift recipient has little input into the gift itself. Gifts may have a limited set of choices defined by the gift purchaser where the gift recipient may have the option of selecting from the limited set of options. Selecting gift choices is typically done based on personal knowledge gathered from intake questions, which can be incorrect or outdated when provided by the purchaser on behalf of the recipient. Additionally, time may pass between the purchase of the gift and the redemption of the gift, further increasing the risk that the gift choices may be incorrect or outdated. The inability to effectively provide gift choices can have an overall negative effect on the customer experience in such cases. For example, receiving gift choices that are unwanted or unrelated to the needs or preferences of a gift recipient at the time when the gift is redeemed can cause the recipient to not use, not like, or ignore the gift choices, thereby reducing the effect of the gift.

Disclosed embodiments may provide a framework to generate a dynamically defined gift object that is initially empty (e.g., devoid of any selectable gift options for redemption) and that is then updated with gift options when the gift associated with the gift object is redeemed by the gift recipient. Predictive models may be generated and/or updated through interaction with the gift purchaser at the time the gift is purchased by taking into account, for example, the intent of the gift purchaser for the gift. Similarly, the predictive models may be generated and/or updated through interaction with the gift recipient at the time the gift is redeemed by taking into account, for example, the one or more gift options selected by the gift recipient. Through this framework, the predictive model of the gift process may be generated. Further, the predictive model of the gift process may be updated based on gift recommendations, gift selections, known or predicted demographics of the gift recipient, seasonal and/or other events, elapsed time intervals, and other such factors. This predictive model of the gift process may be used to generate gift options for the gift recipient. Generating gift options for a dynamically defined gift object may be within the context of a category gift (i.e., a gift that allows the recipient to select from categories of gifts), within the context of a bundled gift (i.e., a gift that allows the recipient to select a plurality of related gifts), or within the context of other such gift types. Performing such gift option generation while minimizing the active solicitation of information from the gift recipient or the gift purchaser reduces the burden of both the gift purchaser and the gift recipient during the course of giving a gift.

FIG. 1 shows an illustrative example of an environment 100 in which gifts are generated for a dynamically defined gift object in accordance with at least one embodiment. In an embodiment, a purchaser 102 (also referred to herein as a "gift purchaser") submits a gift request 106 to a gift service 108 using a computing device 104. As used herein, the gift request is a request for a gift for a recipient 114 to be fulfilled by the gift service 108. Interactions between the recipient 114 and the gift service 108 may be made using a computing device 138. The gift service 108 may be implemented to allow a purchaser to purchase a gift for the gift recipient using a variety of techniques such as those described herein. For example, a gift service 108 may be implemented to allow the purchaser 102 to purchase a gift where different gift options are provided to the recipient 114 (also referred to herein as a "gift recipient") at a future time. In such an embodiment, the gift service 108 may dynamically update a model of the profile of the purchaser 102 and/or the recipient 114 as gift options are presented and/or as gifts are selected from these gift options using the systems and methods described herein. In an embodiment, a gift service 108 can be implemented to allow a purchaser 102 to purchase a gift for their self, where different gift options are provided to the purchaser 102. Although not illustrated in FIG. 1, in an embodiment, a gift service 108 can be implemented to allow a purchaser 102 to purchase gifts for a plurality of recipients. In such an embodiment, the model of the purchaser 102 may be updated based on the actions of the plurality of recipients with respect to the gift options selected and/or the gifts ultimately provided to these recipients.

In an embodiment, a gift service 108 can provide a framework to identify gift categories, curate gifts, present gift alternatives (e.g., gifts other than those originally selected for a recipient, cash equivalents, and/or gift cards), coordinate gift fulfilment, present gift rewards, dynamically update gift predictions, generate gift options, coordinate responses to gifts (e.g., thank you notes and gifts in response), and provide other services related to gifts, gift options, and/or gift fulfilment. In an embodiment, a gift service 108 can provide systems and methods such as those described herein to generate a predictive model for gift fulfilment where the gift recipient 114 is not the gift purchaser 102. In an embodiment, the gift service 108 can provide systems and methods such as those described herein to update the predictive model through interaction with the gift service 108 where the example may be with the gift purchaser 102, may be with the gift recipient 114, and/or may be with a third party. In an embodiment, the gift service 108 can provide systems and methods such as those described herein to generate a predictive model of the gift purchaser 102. In an embodiment, the gift service 108 can provide systems and methods such as those described herein to generate a predictive model of the gift recipient 114. In an embodiment, the gift service 108 can provide systems and methods such as those described herein to update the predictive model of the gift purchaser 102 and/or the predictive model of the gift recipient 114 based on gift options, gift selections, known or predicted demographics of the gift recipient, seasonal and/or other events, elapsed time intervals, and other such factors. In an embodiment, the gift service 108 can provide systems and methods such as those described herein to use those predictive models to generate gift options for the gift recipient. In such an embodiment, as the gift options may be generated over a time interval, the predictive model can be updated to further tailor the gift options to the gift recipient 114 over the time interval.

Figure 25:
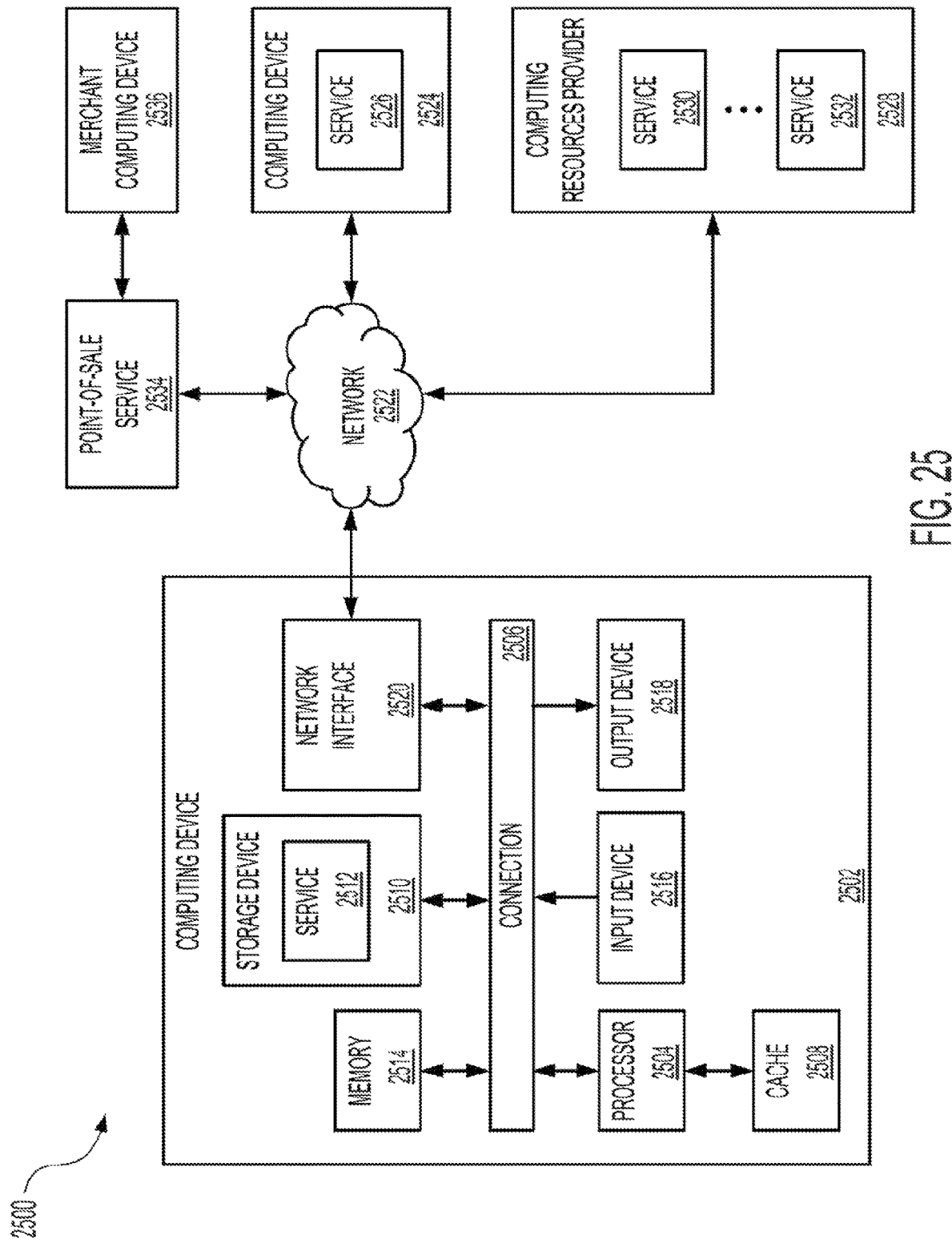
FIG. 25 shows a computing system architecture including various components in electrical communication with each other using a connection in accordance with various embodiments.

In an embodiment, the gift purchaser 102 submits the gift request 106 and/or otherwise interacts with the gift service 108 using the computing device 104, which may be the same as the computing device 2502 described herein at least in connection with FIG. 25. For example, the computing device 104 may be a laptop computer, a desktop computer, a smartphone, a tablet, a smart watch, or some other such computing device such as those described herein. Although not illustrated in FIG. 1, in an embodiment, the gift request 106 is communicated to the gift service 108 using a network such as the network 2522 described herein at least in connection with FIG. 25. In an embodiment, the gift purchaser 102 submits the gift request 106 to the gift service 108 using an application provided by the gift service 108 and installed onto the computing device 104. In an embodiment, the gift purchaser 102 submits the gift request 106 to the gift service 108 using a web service maintained by the gift service 108. In an embodiment, the gift purchaser 102 submits the gift request 106 to the gift service 108 using a web service maintained on behalf of the gift service 108 by a third party service (e.g., a service such as the service 2530 or the service 2532 maintained by a computing resources provider 2528 described herein at least in connection with FIG. 25). In an embodiment, the gift purchaser 102 submits the gift request 106 to the gift service 108 using a kiosk or other point-of-sale service provided by and/or on behalf of the gift service 108 (e.g., a point-of-sale service such as the point-of-sale service 2534 described herein at least in connection with FIG. 25). In such an embodiment, the kiosk or other point-of-sale service may be located at a merchant's location (e.g., at a "brick-and-mortar" store), at a central location (e.g., at a high traffic public venue), or at some other such location. In an embodiment, the point-of-sale service can be located in a mobile location (e.g., in a vehicle and/or some other mobile location). For example, a point-of-sale service can be located in the passenger area of a taxi, or in the back of the seat in a ride share, or on a bus, or on an airplane. In some embodiments, the application, web service, or point-of-sale service provided by the gift service 108 is contextual and can be dynamically updated for different content based on one or more factors such as those described herein (e.g., location of the gift purchaser 102, demographics of the gift purchaser 102 and/or the gift recipient 114, or other such factors).

In an embodiment, the gift recipient 114 interacts with the gift service 108 (e.g., as described herein) using the computing device 138, which may be the same as the computing device 2502 described herein at least in connection with FIG. 25. For example, the computing device 138 may be a laptop computer, a desktop computer, a smartphone, a tablet, a smart watch, or some other such computing device such as those described herein. Although not illustrated in FIG. 1, in an embodiment, the gift recipient 114 interacts with the gift service 108 using a network such as the network 2522 described herein at least in connection with FIG. 25. In an embodiment, the gift recipient 114 interacts with the gift service 108 using an application provided by the gift service 108 and installed onto the computing device 138. In an embodiment, the gift recipient 114 interacts with the gift service 108 using a web service maintained by the gift service 108. In an embodiment, the gift recipient 114 interacts with the gift service 108 using a web service maintained on behalf of the gift service 108 by a third party service such as those described herein. In an embodiment, the gift recipient 114 interacts with the gift service 108 using a kiosk or other point-of-sale service provided by and/or on behalf of the gift service 108 also as described herein.

In an embodiment (not illustrated in FIG. 1), the gift purchaser 102 interacts with an automated process (also referred to herein as a "bot") of the gift service 108. In such an embodiment, the bot may be configured to engage and interact with the gift purchaser 102 and/or may be configured to interact with the gift recipient 114. In such an embodiment, the bot may also be configured to engage and interact with the gift service 108 on behalf of the gift recipient 114. For example, the bot of the gift service 108 may utilize information about the gift recipient 114 as input to a machine learning algorithm, artificial intelligence system, and/or computational model to generate a gift profile for the gift recipient 114. In another example, the bot of the gift service 108 may utilize information about the gift purchaser 102 as input to the machine learning algorithm, artificial intelligence system, and/or computational model to generate a gift profile for the gift purchaser 102. The bot may also be configured to autonomously interact with the gift purchaser 102 and/or the gift recipient 114 to generate gift recommendations, receive gift selections, coordinate gift fulfilment, and perform other tasks related to the gift service 108 such as those described herein. The bot may be configured according to the parameters or characteristics of the profile of the gift purchaser 102. The bot may also be configured according to the parameters or characteristics of the profile of the gift purchaser 102. As the bot communicates with the gift purchaser 102 and/or the gift recipient 114 over time, the bot may be updated to improve the bot's interaction with the gift purchaser 102 and/or the gift recipient 114.

The gift request 106 submitted to a gift service 108 may be a request to present gifts and/or gift choices for the gift recipient 114. In the example environment 100 illustrated in FIG. 1, the gift purchaser 102 and the gift recipient 114 are different entities. In an embodiment, the gift recipient 114 is the same entity as the gift purchaser 102. In such an embodiment, the gift purchaser 102 may be submitting a gift request 106 to receive a gift for their self. In an embodiment, the gift recipient 114 is a plurality of entities such as, for example, a group of friends of the gift purchaser 102, or may be some other such group. In an embodiment a gift request 106 for a plurality of entities is managed by the gift service 108 as a single gift request. In an embodiment, a gift request 106 for the plurality of entities is managed by the gift service 108 as a plurality of gift requests.

In the example illustrated in FIG. 1, when the gift service 108 receives the gift request 106 from the gift purchaser 102, the gift service 108 creates a gift object 110 using systems and methods such as those described herein. In an embodiment, the gift service 108 creates a gift object 110 with an undefined set of gift selection options. A gift object 110 with an undefined set of gift selection options is a gift object that may include information received from the gift purchaser 102 about, for example, the gift recipient, but that does not include any defined set of gift selection options. For example, the gift purchaser 102 may specify who the gift recipient 114 is and may specify some aspects of the gift within the gift request 106. These aspects may include the price or type of the gift, as described in detail herein, and the gift object 110 with an undefined set of gift selection options can be created by the gift service 108 without any defined gift selection options.

As used herein, a gift object 110 with an undefined set of gift selection options is a gift object that does not have any gift selection options defined. For example, a gift to a gift recipient may not have any gift merchandise associated with the gift until aspects of the gift described herein are defined by the gift service 108, the purchaser 102, and/or the recipient 114. With an undefined set of gift selection options, a gift object may potentially include any and all available gifts (e.g., from baby items, to adult clothing, to video games). In an embodiment, as various aspects of the gift are defined using the systems and methods described herein, the set of potential gifts (e.g., the gift selection options) becomes more defined and some gifts may be excluded. For example, when the purchaser 102 chooses a category gift corresponding to video games, gift selection options corresponding to baby items and adult clothing may be removed from the set of potential gift selection options.

A gift object with an undefined set of gift selection options may start as a gift object that represents a gift from a purchaser to a recipient, but one where the merchandise associated with the gift is not initially defined. Consider an example where a gift purchaser wants to give a gift to a recipient, the gift recipient is a child, the gift purchaser wants to send a bundled gift of winter clothes, and the gift purchaser wants to spend one-hundred dollars on the gift. When the gift purchaser 102 sends a gift request with this information to the gift service 108, the merchandise that will be eventually sent to the gift recipient 114 is not yet defined. The bundled gift defines the gift object and the parameters that the bundled gift is a gift of winter clothes for the child with a value of one-hundred dollars may assist the gift service 108 in defining the gift selection options.

At this stage, more information about the gift exists, but the gift object with the undefined set of gift selection options is still a gift object where the gift selection options associated with the gift object are not fully defined. The information received may help to narrow the possible set of gift selection options for the gift object because, for example, the gift service 108 would not offer baby gifts or video games for a bundled gift of winter clothes for a child with a value of one-hundred dollars. As described herein, the gift service 108 may interact with the gift purchaser 102 to obtain additional information about the recipient 114 (e.g., the gender, age, or size of the recipient 114, etc.) in order to further refine the gift selection options that will be presented to the gift recipient 114. For example, the age of the child may allow the gift service 108 to further refine the set of gift selection options. Several examples described herein allow the gift purchaser 102 to further refine the gift selection options by, for example, selecting certain outfits or sets of items to offer to the gift recipient 114 as gift selection options.

When the gift service 108 has refined the set of gift selection options to a manageable set, the gift object with an undefined set of gift selection options becomes a gift object with a defined set of gift selection options. However, the gift object with a defined set of gift selection options may not yet have a finalized set of gift selection options that can be used to redeem a gift. It should be noted that "refining the set of gift selection options to a manageable set" can have different meanings depending on the gift object. For example, a category gift of "hats" may be considered a manageable set of gifts even though there may be thousands of hats to choose from but, for a bundled gift, gift selection options corresponding to a thousand pairs of jeans may not me a manageable set of selection options. Additionally, while the gift purchaser 102 may make some of the choices to refine the set of gift selection options, the gift recipient 114 may also make some of those choices. For example, the gift recipient 114 is likely to select the style, color, and/or size of the items in the bundled gift of winter clothes for a child. It also should be noted that the value of one-hundred dollars placed on the gift may add a constraint to which gift selection options the gift purchaser 102 and/or the gift recipient 114 can select. Even though, as described herein, the gift value may be malleable, it is unlikely that a four-hundred-dollar jacket would ever be a gift selection option for a one-hundred-dollar gift.

The gift purchaser 102 may also specify some of the interests of the gift recipient 114 that may be used by the gift service 108 to define the profile of the gift recipient 114 using systems and methods such as those described herein. For example, the gift purchaser 102 may include information with the gift request 106 that the gift recipient 114 enjoys outdoor activities, or likes video games, or is a fan of a particular genre of music, or a fan of a sports team, or the gift purchaser 102 may include other such information with the gift request 106.

The gift purchaser 102 may also specify some demographics of the gift recipient 114 that may also be used by the gift service 108 to define the profile of the gift recipient 114 using systems and methods such as those described herein. For example, the gift purchaser 102 may include information with the gift request 106 that the gift recipient 114 is a certain age, or identifies as a certain gender, or lives in a particular location, or the gift purchaser 102 may include other such information with the gift request 106.

In an embodiment, the gift purchaser 102 may submit the gift request 106 with a minimal amount of information about the gift recipient 114. In such an embodiment, systems of the gift service 108 may use various techniques to determine the additional information usable to define the profile of the gift recipient 114 including, but not limited to, soliciting such information from the gift recipient 114, generating a computational model of the gift recipient 114, generating information about the gift recipient 114 using contextual information obtained from communications between the gift service 108 and the gift purchasers 102 and/or the gift recipient 114, and/or using other such techniques.

In an embodiment, the gift service 108 uses one or more machine learning algorithms, artificial intelligence techniques, and/or computational models (illustrated in FIG. 1 as the machine learning system 116) to analyze the gift request 106 and/or the profile of the gift recipient 114 to determine various aspects of the gift request 106. For instance, the gift service 108 may use the machine learning system 116 to implement a clustering algorithm that is dynamically trained to identify similar gift recipient profiles, similar gift purchaser profiles, and/or similar gift requests based on one or more vectors (e.g., age, geographic location, other demographic information, other provided information, etc.). In some embodiments, the machine learning system 116 can perform such clustering and obtain partial matches among other gift recipient profiles, other gift purchaser profiles, and/or other gift requests using these vectors. In some instances, a dataset of gift recipient profiles, other gift purchaser profiles, and/or other gift requests corresponding to other gift requests may be analyzed using a clustering algorithm to identify different types of gift recipient profiles, other gift purchaser profiles, and/or other gift requests associated with the gift service 108.

Example clustering algorithms that may trained using sample gift recipient profiles, sample gift purchaser profiles, and/or sample gift requests datasets to analyze the gift request 106 and/or the profiles of the gift recipient 114 so as to determine various aspects of the gift request 106 may include a k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Based on the output of these algorithms, the gift service 108 may determine the various aspects of the gift request 106.

In the example illustrated in FIG. 1, the machine learning system 116 implements various algorithms using machine learning techniques, artificial intelligence systems, and/or computational models as described herein. In the example illustrated in FIG. 1, the machine learning system 116 implements a gift object algorithm 118 and a gift selection algorithm 122. As used herein, a gift object algorithm 118 is an algorithm implemented by the machine learning system 116 that is used to generate gift objects. The gift object algorithm 118 may be dynamically trained using a dataset of sample gift objects and corresponding gift options using systems and methods such as the those described herein (i.e., using various machine learning techniques, various artificial intelligence systems, and/or using various computational models such as those described herein). As used herein, a gift selection algorithm 122 is an algorithm implemented by the machine learning system 116 that is used to generate gift selection options. The gift selection algorithm 122 may be trained using a dataset of sample gift objects, corresponding gift selection options generated based on the sample gift objects, and gift selections for the sample gift objects, also using systems and methods such as the those described herein (i.e., using various machine learning techniques, various artificial intelligence systems, and/or using various computational models such as those described herein).

In the example illustrated in FIG. 1, the machine learning system 116 may also implement other gift algorithms 136 such as, for example, gift fulfillment algorithms, thank-you note algorithms, payment processing algorithms, gift recommendation algorithms, and/or other such algorithms. In an embodiment, these other gift algorithms 136 can be performed by other systems of the gift service 108 (not illustrated in FIG. 1). In an embodiment, the gift object algorithm 118, the gift selection algorithm 122, and/or the other gift algorithms 136 may be fully implemented using the machine learning system 116. In an embodiment, the gift object algorithm 118, the gift selection algorithm 122, and/or the other gift algorithms 136 may be partially implemented using the machine learning system 116. In such an embodiment, the gift object algorithm 118, the gift selection algorithm 122, and/or the other gift algorithms 136 may be partially implemented by other systems (not illustrated in FIG. 1) of the gift service 108. Although not illustrated in FIG. 1, in an embodiment, the gift object algorithm 118, the gift selection algorithm 122, and/or the other gift algorithms 136 may be fully implemented by other systems (not illustrated in FIG. 1) of the gift service 108.

When the gift service 108 has created the gift object 110 with an undefined set of gift selection options using systems and methods such as those described herein, in an embodiment, the gift service 108 then defines the gift object 120 using the gift object algorithm 118. In an embodiment, the gift service 108 defines the gift object 120 using the gift object algorithm 118 by associating various parameters with the gift object. For example, the parameters associated with the gift object may indicate the purchaser intent (as described herein), the type of gift object (single gift, bundled gift, category gift, etc.), the value of the gift, delivery methods, a profile of the purchaser 102, a profile of the recipient 114, and/or other such parameters. These parameters and how they are associated with the gift object are described in detail herein. In an embodiment, the gift service 108 may first determine whether the gift object 110 is a category gift, a bundled gift, or some other such type of gift (e.g., a single gift).

It is important to note that the gift selection options for the gift object are not defined at this point in the gift redemption process. For a dynamically defined gift object such as those described herein, the gift selection options are defined when the recipient 114 begins the process of gift redemption. A dynamically defined gift object such as those described herein delays the definition of the gift selection options corresponding to available gifts that may be presented to the gift recipient 114 to a point that is later in the gift redemption process. This is in contrast to a gift object where the purchaser 102 defines the gift selection options at the time that the gift is purchased. As described herein, a dynamically defined gift object is not fully specified until the redemption of the gift by the recipient.

In an embodiment, the gift service 108 notifies the gift recipient 112 of the gift after the gift service 108 defines the gift object 120 using the gift object algorithm 118. In an embodiment, the gift service 108 notifies the gift recipient 112 of the gift by sending a notification from the gift service 108 to the gift recipient 114 using, for example, an application running on the computing device 138 such as the applications described herein. In an embodiment, the notification of the gift sent from the gift service 108 to the gift recipient 114 includes information including, but not limited to, the gift purchaser 102, the gift type, the gift value, etc. For example, the notification of the gift sent from the gift service 108 to the gift recipient 114 may include a message such as "Your Friend got you a Gift" and may provide details regarding the gift. In an embodiment, the notification of the gift sent from the gift service 108 to the gift recipient 114 includes information that allows the gift recipient 114 to begin the process of redeeming the gift using systems and methods such as those described herein. In an embodiment, the notification of the gift sent from the gift service 108 to the gift recipient 114 includes links and/or user interface elements that allow the gift recipient 114 to begin the process of redeeming the gift associated with the gift object (i.e., the gift object generated by the gift request 106).

In an embodiment, the gift service 108 notifies the gift recipient 112 of the gift before the gift service 108 defines the gift object 120 using the gift object algorithm 118. For example, the gift service 108 may notify the gift recipient 112 of the gift when the gift request 106 is received and before the gift service 108 creates the gift object 110. In another example, the gift service 108 may notify the gift recipient 112 of the gift after the gift service 108 creates the gift object 110 and before the gift service 108 then defines the gift object 120 using the gift object algorithm 118.

In an embodiment, when the gift recipient 114 receives the notification of the gift sent from the gift service 108 to the gift recipient 114 (e.g., as a result of the gift service 108 notifying the gift recipient 112), the gift recipient 114 can begin redemption 124 of the gift. When the gift recipient 114 begins redemption 124 of the gift, the gift recipient 114 may send a redemption request to the gift service 108. As used herein, a redemption request begins redemption 124 of the gift. In an embodiment, the gift recipient 114 can decline the gift and, for example, request a cash value of the gift, request a gift card in an amount corresponding to the monetary value of the gift, return the gift to the purchaser 102, exchange the gift for a different gift and/or a gift from a different retailer, donate the gift to charity, exchange the monetary value of the gift for another value (e.g., for stocks, cryptocurrency, and/or other monetary-value adjacent items), exchange the monetary value of the gift for "loyalty points" or some other membership-associated value, and/or perform other such actions using systems and methods such as those described herein.

In the example illustrated in FIG. 1, when the gift recipient 114 sends a redemption request to begin redemption 124 of the gift, the gift service 108 defines the gift selection options 126 for the gift object using the gift selection algorithm 122. For example, a single gift may have a set of selection options that define the gift (e.g., a red wool stocking cap). In another example, a category gift may have a set of selection options that define the category of the gift (e.g., a hat), but that allow the gift recipient 114 to determine what type of hat and/or what color of hat. In another example, a bundled gift may include a stocking cap and a jacket, but the color of the hat and the size, color, and/or style of the jacket may be determined by the gift recipient through the gift selection options. In an embodiment, the gift selection options 126 for the gift object that are determined using the gift selection algorithm 122 include a custom set of gift selection options that are generated using systems and methods such as those described herein.

In an embodiment, the gift service 108 presents the determined gift selection options 128 to the gift recipient 114 using, for example, the computing device 138. For example, for a single gift, the system may present a gift selection option corresponding to a red stocking cap to the gift recipient 114 with options to accept or decline the gift. For a category gift, the system may present different gift selection options corresponding to different hats for the recipient 114 with functionality to choose, through selection of a gift selection option, a particular hat. As another illustrative example, for a bundled gift, the system may present gift selection options corresponding to different hats and jackets to the recipient with functionality to choose gift selection options corresponding to the hat color and the size, color, and/or style of the jacket.

In an embodiment, the gift recipient 114 selects an option 130 from the gift selection options presented to the recipient 114. For example, the recipient may select (or decline) the red stocking cap, select a gift selection option corresponding to a blue baseball cap for the category gift, and select a gift selection option corresponding to a brown stocking cap with a brown snowboarding jacket for the bundle gift. When the recipient 114 selects an option 130 from the determined gift selection options 128 presented to the gift recipient as described herein, the gift service can, in an embodiment, finalize the gift 132, which may include sending the gift 134 to the gift recipient 114. In an embodiment, when the recipient 114 selects an option 130 from the determined gift selection options 128 presented to the gift recipient, the option 130 includes a selection of a gift selection option from the custom set of gift selection options (e.g., the custom set of gift selection options included in the defined gift selection options 126).

In an embodiment, the recipient 114 can select an option that is not one of the determined gift selection options 128. For example, the recipient 114 can decline the gift and, in an embodiment, return the value of the gift to the purchaser 102. In an embodiment, the recipient 114 can elect to receive an equivalent value of the gift (e.g., as a gift card or a store credit as described herein). In an embodiment, the recipient 114 can elect to receive an equivalent value for a portion of the gift. For example, if the recipient 114 receives a bundled gift with a hat, a pair of gloves, and a shirt, the recipient may elect to receive the hat and gloves and receive an equivalent value for the shirt. In an embodiment, the recipient 114 can elect to exchange the gift for a different gift of the same type (e.g., a different type of hat), a gift of a different type (e.g., a pair of gloves instead of a hat or a video game instead of a hat), or a gift from a different retailer. In an embodiment, when a recipient elects one of these alternatives, a profile of the recipient 114 may be updated and/or the gift selection algorithm may be updated. In an embodiment, when a recipient 114 declines a category gift, a new set of categories can be generated by the gift service 108. Similarly, in an embodiment, when a recipient 114 declines a bundled gift, a new gift bundle may be generated by the gift service 108.

In an embodiment, when the recipient 114 selects an option 130 in response to receiving the determined gift selection options 128 presented to the gift recipient 114 (including, but not limited to, selecting an alternate value, electing not to receive a gift, requesting a different set of gift selection options, exchanging the gift, donating the gift, and/or performing other such actions in response to the gift selection options), the gift service 108 and/or the machine learning system 116 perform operations to update the gift object algorithm 118, the gift selection algorithm 122, and/or the other gift algorithms 136 using systems and methods such as those described herein. In an embodiment, the gift service 108 and/or the machine learning system 116 updates the gift object algorithm 118, the gift selection algorithm 122, and/or the other gift algorithms 136 based on the contents of and/or the processing of the gift request 106. In an embodiment, the gift service 108 and/or the machine learning system 116 updates the gift object algorithm 118, the gift selection algorithm 122, and/or the other gift algorithms 136 based on the contents of and/or the processing of the request to begin redemption 124 of the gift. In an embodiment, the gift service 108 and/or the machine learning system 116 updates the gift object algorithm 118, the gift selection algorithm 122, and/or the other gift algorithms 136 based on the contents of and/or the processing of the custom set of gift selections included in the gift selection options 126 presented to the recipient 114. In an embodiment, the gift service 108 and/or the machine learning system 116 updates the gift object algorithm 118, the gift selection algorithm 122, and/or the other gift algorithms 136 based on the contents of and/or the processing of the chosen selection of the custom set of gift selections received from the recipient when the recipient selects the gift options 130.

In an embodiment, the gift object algorithm 118, the gift selection algorithm 122, and the other gift algorithms 136 are dynamically updated, in real-time, as requests from different purchasers and different recipients are processed by the gift service 108. For example, when the recipient 114 selects an option 130 in response to receiving the determined gift selection options 128 presented to the recipient 114, the gift object algorithm 118, the gift selection algorithm 122, and/or the other gift algorithms 136 may be dynamically updated, in real-time, as other requests from other purchasers and recipients are simultaneously being processed in parallel to the recipient's interaction with the gift service 108. This may allow for the continuous, dynamic, and real-time update of the aforementioned algorithms as requests from different purchasers and recipients are received and processed by the gift service 108 as described herein.

It should be noted that while the operations to notify the recipient 112 and to present the gift selection options 128 are illustrated in FIG. 1 as separate and non-contemporaneous operations, in an embodiment, the notification to the recipient and the presentation of the gift selection options to the recipient 114 are sent at the same time so that the recipient 114 may receive a notification of the gift that also includes the gift options. In such an embodiment, the process to begin redemption of the gift (i.e., the redemption request) may be implicit in the gift object. In such an embodiment, the process to begin redemption of the gift (i.e., the redemption request) may be sent contemporaneously with the gift chosen when the recipient 114 selects an option 130 in response to receiving the determined gift options 128.

In an embodiment, the operations described herein to generate a dynamically defined gift object that are performed by the gift service 108 such as, for example, creating the gift object, defining the gift object, defining the gift selection options, notifying the recipient, presenting the gift selection options, and sending the gift as well as the operations performed by the gift purchaser 102 (sending the gift request) and the gift recipient 114 (beginning redemption and selecting the gift selection option) can be performed in parallel and in real-time. For example, the gift object can be created at the same time that the gift object is defined, and one or both of those operations can be performed at the same time that the recipient 114 is notified of the gift. Similarly, while operations described herein may be described as happening in a particular order, the operations can also be performed in real-time, in parallel, and in different orders. For example, while the operations to notify the recipient 114 and to present the gift selection options are illustrated as separate and non-contemporaneous operations, the notification to the recipient 114 and the presentation of the gift selection options to the recipient 114 can be sent at the same time (i.e., contemporaneously, in parallel, and in real-time) so that the recipient 114 may receive a notification of the gift at the same time that the recipient 114 receives the gift options. Similarly, the process to begin redemption of the gift (i.e., the redemption request) may be sent at the same time (i.e., contemporaneously, in parallel, and in real-time) with the selected option (i.e., the option selected in response to receiving the determined gift options).

In an embodiment, the process to send the gift 134 to the gift recipient 114 is performed by a gift fulfilment system (not illustrated) of the gift service 108 which is configured to receive instructions from the gift service 108 and to initiate a process to send the gift 134 to the gift recipient 114. In an embodiment, the process to send the gift 134 to the gift recipient 114 includes sending a message from the gift service 108 to the gift fulfillment service, which may then initiate one or more processes to obtain the gift 134, package the gift 134, and deliver the gift 134 to the gift recipient 114. In an embodiment, the gift fulfillment service is part of the gift service 108. In an embodiment, the gift fulfillment service is a third-party service that is separate from the gift service 108. In an embodiment, information regarding the processes of providing the gift 134 to the gift recipient 114 is included in a profile of the gift recipient 114 and/or in the gift request 106. In an embodiment, the process to send the gift 134 to the gift recipient 114 is initiated by sending a message or other such communication to a retailer so that the retailer acts as the gift fulfilment service. For example, the gift service 108 may use an online service of a retailer to select and purchase the selected gift and the retailer may then package the gift and deliver the gift to the gift recipient 114. In an embodiment, the process to send the gift 134 to the gift recipient 114 is initiated by sending a message or other such communication to a retail service of a computing resources provider such as the computing resources provider 2528 described herein at least in connection with FIG. 25. In an embodiment, the process to send the gift 134 to the gift recipient 114 is performed by a third-party such as, for example, a third-party gift fulfilment system (not illustrated). In an embodiment, the process to send the gift 134 to the gift recipient 114 is performed by a merchant or retailer (e.g., the merchants described herein at least in connection with FIG. 25).

In an embodiment, not illustrated in FIG. 1, the nature of the dynamically defined gift object may be changed during the interactions described herein. For example, a retailer or merchant such as those described herein at least in connection with FIG. 25 may present a dynamically defined gift object to a gift recipient 114 and the gift object may have a type specified (e.g., a category gift, a bundled gift, etc.), may have gift selection options chosen, and may present those gift selection options to the gift recipient 114 using systems and methods such as those described herein. In an embodiment, the gift recipient 114, the gift service 108, and/or the retailer may determine that the type of the gift object may be changed (e.g., from a category gift to a bundled gift or vice versa) and may update the gift object and/or the gift selection options accordingly. The systems and methods described herein allow both delayed specification of the dynamically defined gift object as well as updating and/or alteration of the parameters of the dynamically defined gift object up to and/or beyond the sending of the gift.

In an embodiment, the gift purchaser 102 is a corporate gifting customer where, for example, a gift recipient 114 can select a dynamically defined gift object as part of a rewards program such as an employee incentive program or a loyalty program. In such an embodiment, a gift recipient 114 may select a category gift such as, for example, gifts in a "fitness" category. In such an embodiment, a gift recipient 114 may also select a bundled gift such as, for example, outfits such as those described herein. The systems and methods described herein may then be used so that the gift service 108 can complete the process of providing the dynamically defined gift object (i.e., the category gift or the bundled gift) to the gift recipient 114 for the corporate gift purchaser 102.

Figure 2:
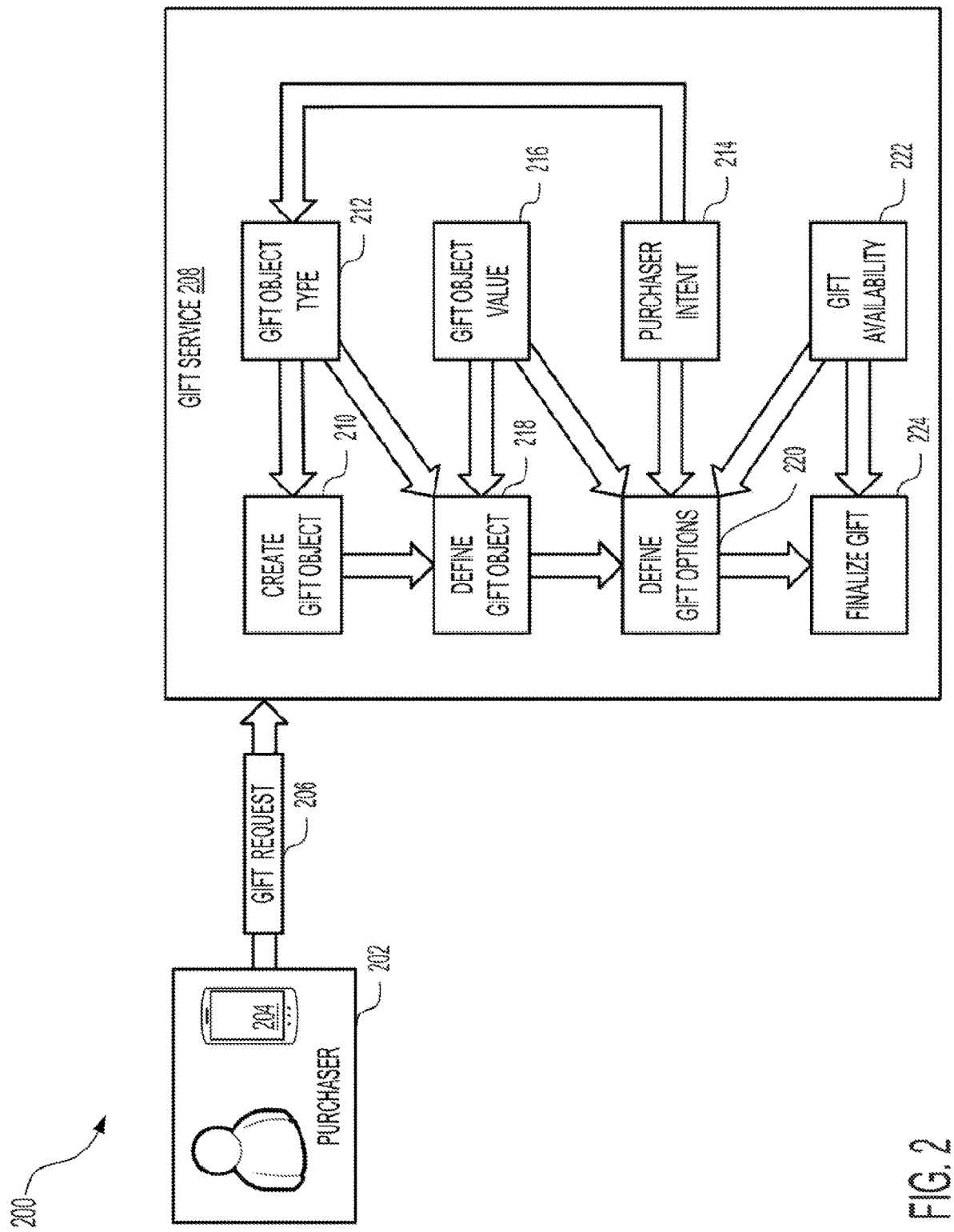
FIG. 2 shows an illustrative example of an environment in which gift selection criteria are determined and gifts are generated for a dynamically defined gift object in accordance with at least one embodiment.

FIG. 2 shows an illustrative example of an environment 200 in which gift selection option criteria are determined and gift selection options are generated for a dynamically defined gift object in accordance with at least one embodiment. In the example illustrated in FIG. 2, a gift purchaser 202 (which is the same as the gift purchaser 102 described herein at least in connection with FIG. 1) uses a computing device 204 (which is the same as the computing device 104 described herein at least in connection with FIG. 1) to send a gift request 206 (which is the same as the gift request 106 described herein at least in connection with FIG. 1) to a gift service 208 (which is the same as the gift service 108 described herein at least in connection with FIG. 1) using systems and methods such as those described herein.

In the example illustrated in FIG. 2, when the gift service 208 receives the gift request 206 from the gift purchaser 202, the gift service 208 creates a gift object 210 with an undefined set of gift selection options (which is the same as the gift object 110 described herein at least in connection with FIG. 1). In the example illustrated in FIG. 2, the gift service 208 creates a gift object 210 with an undefined set of gift selection options using a gift object type 212. In an embodiment, the gift object type 212 is a parameter of the gift object such as, for example, a category gift, a bundle gift, a single gift, or some other such gift object type. In an embodiment, the gift object type can be determined by the gift purchaser 202 and specified in the gift request 206. In the example illustrated in FIG. 2, the gift object type 212 is based on a purchaser intent 214 that reflects the intent of the gift purchaser 202. In an embodiment, the purchaser intent 214 is also specified in the gift request 206.

In an embodiment, the purchaser intent 214 is explicitly specified in the gift request 206 such as, for example, the purchaser choosing a bundle gift when creating the gift request 206. In an embodiment, the purchaser intent 214 may be determined using systems and methods such as those described herein. For example, a gift object algorithm, such as the gift object algorithm 118 described herein at least in connection with FIG. 1, may use real-time communications between the purchaser 202 and the gift service 208 as these communications are exchanged to generate a computational model of the purchaser intent 214 using machine learning and/or artificial intelligence techniques such as those described herein (e.g., using the machine learning system 116 described herein at least in connection with FIG. 1, using Natural Language Processing (NLP), etc.). In an embodiment, the gift service 208 may use that computational model of the purchaser intent 214 to determine the gift object type 212 when creating the gift object 210 using the gift object algorithm. For example, a machine learning system such as the machine learning system 116 described herein at least in connection with FIG. 1 may perform clustering and obtain partial matches among other purchasers and/or purchaser intents. In some instances, a dataset of characteristics corresponding to profiles of other gift recipient and/or gifts may be analyzed using a clustering algorithm to identify different types of profiles and gifts associated with the gift service 108 and thereby to inform future gift object selections.

As described herein, the gift service 208 creates the gift object 210 with an undefined set of gift selection options using systems and methods such as those described herein. In an embodiment, the gift service 208 then defines the gift object 218 using a such as the gift object algorithm 118 described herein at least in connection with FIG. 1. As described herein, the gift service 208 defines the gift object 218 using the gift object algorithm by associating various parameters with the gift object. In the example illustrated in FIG. 2, the gift service 208 defines the gift object 218 using the gift object type 212 and also using a gift object value 216.

In an embodiment, the gift object value 216 is a monetary value of the gift specified in the gift request 206. For example, the purchaser 202 may specify a fifty-dollar gift for the gift recipient (e.g., the gift recipient 114 described herein at least in connection with FIG. 1). In an embodiment, the gift object value 216 is a range of values (e.g., from fifty-dollars to one-hundred dollars). In an embodiment, the gift object value 216 is a minimum value (e.g., at least fifty-dollars). In an embodiment, the gift object value 216 is a maximum value (e.g., no more than one-hundred dollars).

In an embodiment, the gift object value 216 is a mutable value that may be determined and/or updated multiple times during the processes for generating dynamically determined gifts described herein. For example, the purchaser 202 may purchase a gift with a value of fifty-dollars that is specified in the gift request 206. This gift with a value of fifty-dollars may cause the gift service 208 to establish (or determine) an initial gift object value 216 of fifty dollars. However, it should be noted that the gift object has an undefined set of gift selection options until the recipient begins the redemption process and accordingly, as the gift service 208 defines the gift object, defines the gift selection options, and finalizes the gift based on the selected gift selection options using the systems and methods such as those described herein, the gift object value 216 of fifty dollars is mutable and may change. For example, a category gift with a ten-dollar discount promotion for gifts of that category may have an increased value when the gift service 208 defines the gift object 218 so that a fifty-dollar gift may have a sixty-dollar gift object value 216 when the gift service 208 defines the gift object. Similarly, when the gift service 208 defines the gift selection options 220, gifts with a range of values of, for example, forty-dollars to seventy-dollars (e.g., based on price changes) may be included in the gift selection options. Other factors may also change the gift object value 216 during the processes described herein. For example, for a bundle gift, there may be a discount for purchasing the bundle so that a gift purchased for fifty-dollars may be redeemable for eighty-dollars' worth of gifts.

In an embodiment, the gift service 208 may provide a "price guarantee" for a dynamically defined gift object so that, for example, when a gift purchaser 202 initiates a gift request 206 for a gift that is on sale and that gift subsequently goes back up in price (i.e., the sale ends) the gift recipient may accept that gift at the increased price. In an embodiment, the difference between the sale price and the non-sale price may be covered, paid for, or absorbed by the gift service 208 with, for example, a credit card, a coupon, or some other such payment method. In an embodiment where the gift purchaser 202 is a corporate gift purchaser (as described herein), the gift service 208 may allow a range of product prices as a selection for the gift request 206. For example, if a gift purchaser 202 wishes to send a one-hundred dollar gift, the gift service 208 may present gift objects across a range of prices that are both above and below one-hundred dollars since the neither the gift purchaser 202 nor the gift recipient may be influenced by how close to one-hundred dollars the gift options (described herein) products cost.

In the example illustrated in FIG. 2, when the gift service 208 has created the gift object 210 with an undefined set of gift selection options using systems and methods such as those described herein, the gift service 208 then defines the gift object 218 using a gift object algorithm such as the gift object algorithm 118 described herein at least in connection with FIG. 1. As described herein, the gift service 208 defines the gift object 218 using the gift object algorithm by associating various parameters with the gift object. In the example illustrated in FIG. 2, the gift service 208 defines the gift object 218 using the gift object type 212 and/or the gift object value 216 (both as described herein). Although not illustrated in FIG. 1, in an embodiment, the gift service 208 can define the gift object 218 using purchaser intent 214 as described herein.

In the example illustrated in FIG. 2, when the gift service 208 has defined the gift object 218 using systems and methods such as those described herein, the gift service 208 then defines the gift selection options 220 using a gift selection algorithm such as the gift selection algorithm 122 described herein at least in connection with FIG. 1. In the example illustrated in FIG. 2, defines the gift selection options using gift object value 216 and/or the purchaser intent 214, both as described herein. In an embodiment, the gift service 208 defines the gift selection options 220 using a gift availability 222. For example, a gift that has limited availability may not be included in the gift selection options 220 or may be included in the defined gift selection options 220 with an indication that the gift selection option may be subject to limited availability. Similarly, a gift that is not available at all may not be included in the gift selection options 220. In another example, a gift that has a high availability (e.g., is plentiful) may be preferred in the defined gift selection options 220. Although not illustrated in FIG. 2, in an embodiment, changes to gift availability 222 may dynamically impact the gift object value 216 of the gift in real-time, as merchandise with a low availability may have a higher price at the time of redemption while merchandise with a high availability may have a lower price at the time of redemption. As used herein, merchandise associated with the gift (i.e., the items chosen to fulfil the gift request 206) may be referred to as "gift merchandise" or "gift items" or simply as "gifts").

In an embodiment, the gift service 208 defines the gift selection options 220 using the gift selection algorithm and the mutable gift object value as described herein. As described herein, when the gift service 208 defines the gift selection options 220, gifts with values that are greater than or less than the specified gift object value (e.g., the gift object value specified in the gift request 206) may be included in the gift selection options based on varying pricing factors that may exist at the time that the gift service 208 defines the gift selection options 220 using the gift selection algorithm. Similarly, for a bundle gift, there may be a discount for purchasing the bundle so that a gift purchased for a specified gift object value (e.g., the gift object value specified in the gift request 206) may include gift bundles with merchandise that has a greater value than the specified gift object value.

As described herein, when the recipient selects a gift selection option from the defined gift selection options 220 presented to the gift recipient, the gift service 208 will finalize the gift 224 using systems and methods such as those described herein. In an embodiment the gift service 208 may finalize the gift 224 using gift availability 222 as described herein. For example, if the recipient selects a gift that has become unavailable, the gift service 208 may offer an alternative gift selection option. In an embodiment, when a gift becomes unavailable, the gift service 208 may restart the processes described herein at an earlier stage such as, for example, at the stage where the gift service 208 defines the gift selection options 220 that are presented to the gift recipient. In an embodiment, the check by the gift service 208 as to the availability or unavailability of a gift occurs before the gift service 208 defines the gift selection options 220 that are presented to the gift recipient. In an embodiment, the gift service 208 may update a gift object algorithm such as the gift object algorithm 118, a gift selection algorithm such as the gift selection algorithm 122, and/or other gift algorithms such as the other gift algorithms 136 (all described herein at least in connection with FIG. 1) based on the gift availability 222. For example, the gift selection algorithm may be updated to not select a gift selection option that has gone out of stock.

Figure 3:
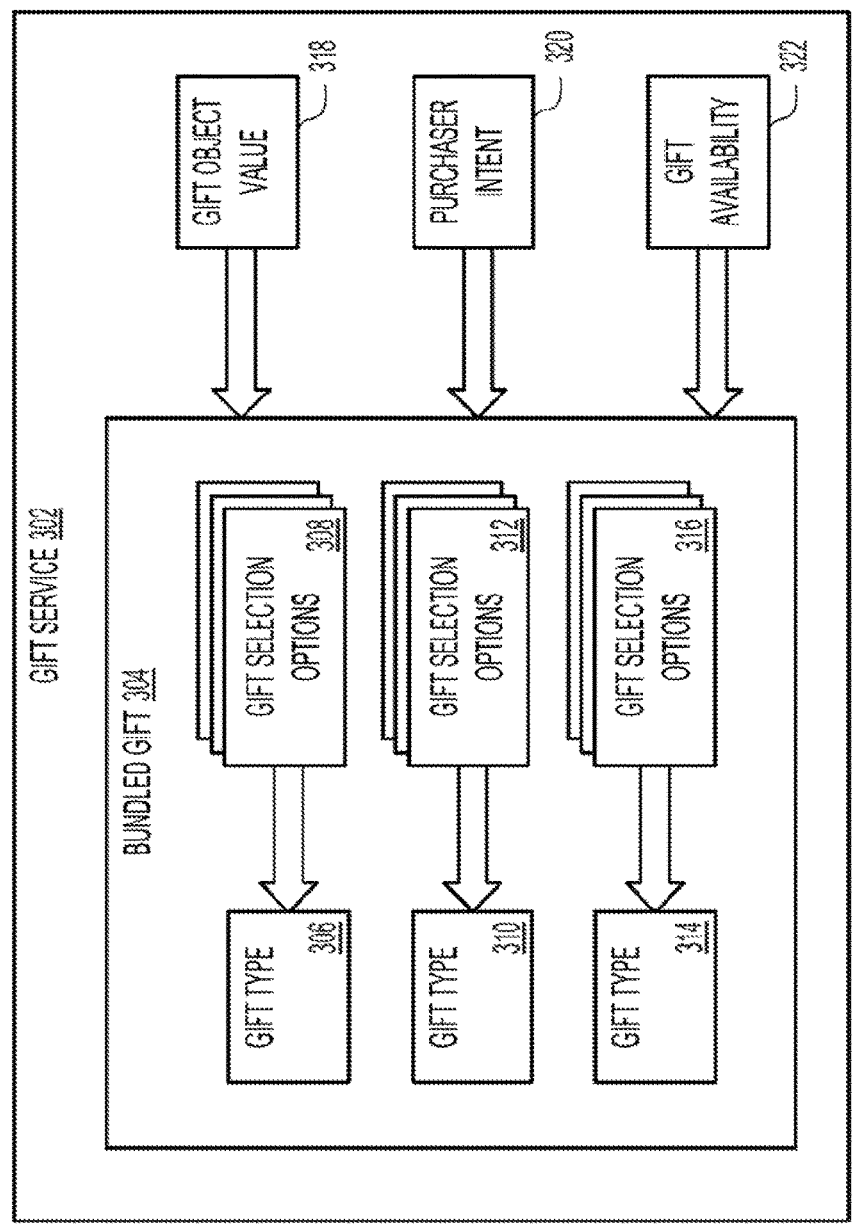
FIG. 3 shows an illustrative example of an environment in which bundled gifts are generated for a dynamically defined gift object in accordance with at least one embodiment.

FIG. 3 shows an illustrative example of an environment 300 in which bundled gifts are generated for a dynamically defined gift object in accordance with at least one embodiment. In the example illustrated in FIG. 3, a gift service 302 (which is the same as the gift service 108 described herein at least in connection with FIG. 1) generates a bundled gift 304, using the gift object value 318 (which is the same as the gift object value 216 described herein at least in connection with FIG. 2), the purchaser intent 320 (which is the same as the purchaser intent 214 described herein at least in connection with FIG. 2), and/or the gift availability 322 (which is the same as the gift availability 222 described herein at least in connection with FIG. 2) using systems and methods such as those described herein. In the example illustrated in FIG. 3, the gift object type (e.g., the gift object type 212 described herein at least in connection with FIG. 2) is not shown, but may also be used by the gift service 302 to generate the bundled gift 304.

In the example illustrated in FIG. 3, the bundled gift 304 (also referred to herein as a "bundle gift") includes a first gift type 306 with gift selection options 308, a second gift type 310 with gift selection options 312, and a third gift type 314 with gift selection options 316. For example, the bundled gift 304 may be a gift bundle that includes a hat, a shirt, and some pants (such as the bundle described herein at least in connection with FIG. 13). In such an example, if the first gift type 306 is for the hat, the gift selection options 308 may include, for example, a red wool hat, a baseball cap, and a blue acrylic beanie. Similarly, if the second gift type 310 is for the shirt, the gift selection options 312 may include a checked flannel long-sleeve shirt, a baseball jersey, and a t-shirt. Similarly, if the third gift type 314 is for the pants, the gift selection options 316 may include a pair of jogger pants, a pair of jeans, and a pair of cargo shorts.

In an embodiment, the gifts in the bundled gift 304 are offered in groups (or outfits). In such an embodiment, the gift recipient (such as the gift recipient 114 described herein at least in connection with FIG. 1) may choose from the outfits. Using the example above, the first outfit offered to the gift recipient may be the red wool hat, the checkered flannel long-sleeve shirt, and the jogger pants, second outfit offered to the gift recipient may be the baseball cap, the baseball jersey, and the pair of jeans, and the third outfit offered to the gift recipient may be the blue acrylic beanie, the t-shirt, and the pair of cargo shorts. In an embodiment, the gifts in the bundled gift 304 are selectable as miscible sets so that, for example, the gift recipient may select one item from the gift selection options 308, one item from the gift selection options 312, and one item from the gift selection options 316. In such an embodiment and using the example above, the gift recipient may, for example, select the red wool hat, the baseball jersey and the pair of cargo shorts for the bundled gift 304.

Although not illustrated in FIG. 3, in an embodiment, the gift selection options 308, the gift selection options 312, and/or the gift selection options 316 may include backup options that can be offered in the event that a particular item is not available. Using the example above, the gift selection options 308 (e.g., for the hat) may include a backup option for a green wool hat if, for example, the red wool hat becomes unavailable. Similarly, the gift selection options 316 (e.g., for the pants) may include a backup option for a pair of jeans in a different style if the pair of jeans offered in the gift selection options 316 becomes unavailable.

Similarly, although not illustrated in FIG. 3, in an embodiment, bundled gifts and/or category gifts can be presented to a gift recipient in pre-defined sets in, for example, a retailer's "cart" application so that a gift purchaser can easily select from a large number of gift selection options, but can also select a plurality of gifts for each of those gift selection options (e.g., for a category gift or a bundled gift). The systems and methods described herein further facilitate dynamic changes that may be made to those pre-defined sets by the gift recipient so that while a gift purchaser may quickly send a plurality of gifts to a gift recipient, the gift recipient may also quickly customize that plurality of gifts (i.e., by swapping out some or all of the gifts offered, as described herein, to further customize the gifts received).

Figure 4:
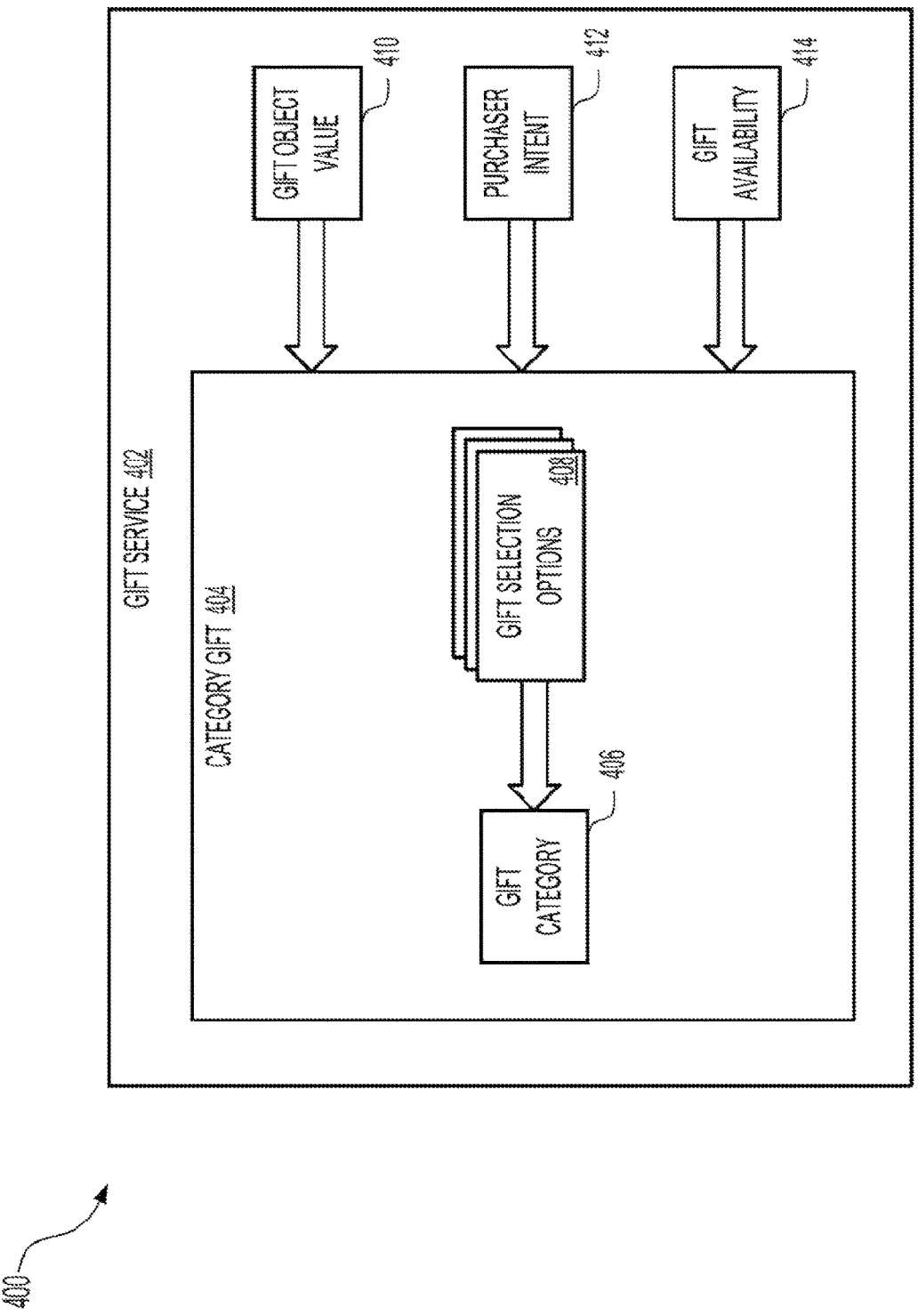
FIG. 4 shows an illustrative example of an environment in which category gifts are generated for a dynamically defined gift object in accordance with at least one embodiment.

FIG. 4 shows an illustrative example of an environment 400 in which category gifts are generated for a dynamically defined gift object in accordance with at least one embodiment. In the example illustrated in FIG. 4, a gift service 402 (which is the same as the gift service 108 described herein at least in connection with FIG. 1) generates a category gift 404, using the gift object value 410 (which is the same as the gift object value 216 described herein at least in connection with FIG. 2), the purchaser intent 412 (which is the same as the purchaser intent 214 described herein at least in connection with FIG. 2), and/or the gift availability 414 (which is the same as the gift availability 222 described herein at least in connection with FIG. 2) using systems and methods such as those described herein. In the example illustrated in FIG. 4, the gift object type (e.g., the gift object type 212 described herein at least in connection with FIG. 2) is not shown, but may also be used by the gift service 402 to generate the category gift 404.

In the example illustrated in FIG. 4, the category gift 404 includes a gift category 406 with gift selection options 408 where the gift selection options 408 are gifts that are of the gift category 406. For example, the category gift 404 may be for a sports jersey (such as the category gift described herein at least in connection with FIG. 7) or for a pair of jeans (such as the category gift described herein at least in connection with FIG. 16). If, for example, the gift category 406 is for the sports jersey, the gift selection options 408 may include sports jerseys for different sports, and/or for different teams of those sports. Such a category gift 404 may allow the gift recipient to first select from different sports (e.g., baseball teams, football teams, basketball teams, etc.) and then to select from different teams of the chosen sport. Although not illustrated in FIG. 4, in an embodiment, the gift selection options 408 may include backup gift selection options that can be offered in the event that a particular item is not available such as those backup gift selection options described herein.

Figure 5:
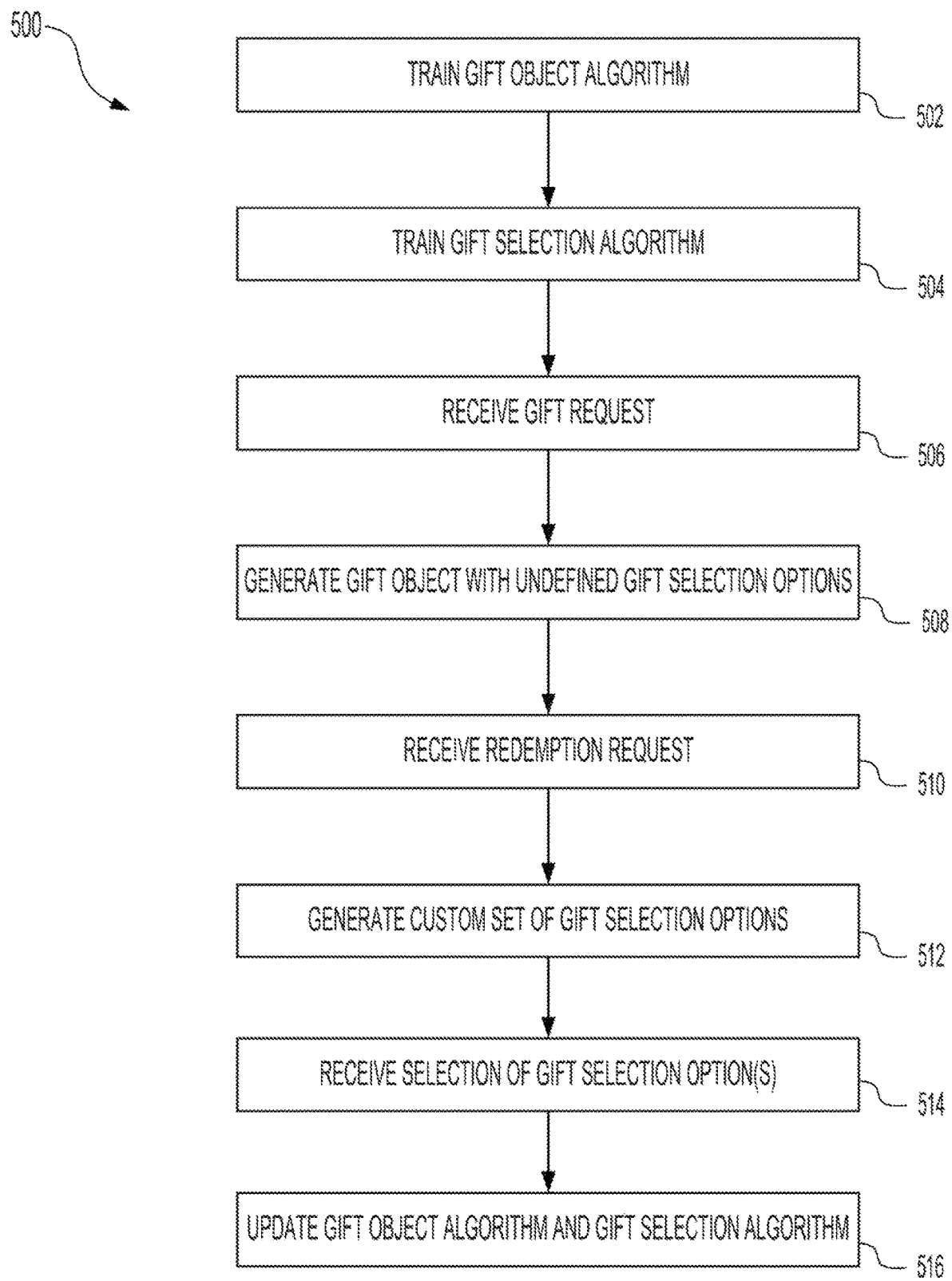
FIG. 5 shows an illustrative example of a process for generating gifts for a dynamically defined gift object in accordance with at least one embodiment.

FIG. 5 shows an illustrative example of a process 500 for generating gifts for a dynamically defined gift object in accordance with at least one embodiment. Components of a gift service such as the gift service 108 described herein at least in connection with FIG. 1 may perform the process 500 illustrated in FIG. 5.

At step 502 of the example process 500, the gift service dynamically trains a gift object algorithm to generate gift objects using a dataset of sample gift objects and the corresponding gift selection options. In an embodiment, the sample dataset may be from test data, automatically generated data, or live data from previous gift objects defined by the gift service. In an embodiment, the gift object algorithm is dynamically trained in real-time as gift requests and gift redemptions requests are processed by the gift service for different gift purchasers and recipients.

At step 504 of the example process 500, the gift service trains a gift selection algorithm to generate gift selection options using a dataset of sample gift objects, corresponding gift selection options generated based on the sample gift objects, and selections from these gift selection options for the sample gift objects. In an embodiment, the sample dataset may be from test data, automatically generated data, or live data from previous gift selections made by recipients for different gift objects.

At step 506 of the example process 500, the gift service receives a gift request from a gift purchaser such as the gift purchaser 102 described herein at least in connection with FIG. 1. In an embodiment, the gift request includes a purchaser intent such as the purchaser intent 214 described herein at least in connection with FIG. 2.

At step 508 of the example process 500, the gift service generates a gift object with undefined gift selection options by applying a gift object algorithm such as the gift object algorithm 118 described herein at least in connection with FIG. 1 to the purchaser intent, a gift object type (e.g., the gift object type 212 described herein at least in connection with FIG. 2), and a gift object value (e.g., the gift object value 216 also described herein at least in connection with FIG. 2).

At step 510 of the example process 500, the gift service receives a redemption request from a gift recipient such as the gift recipient 114 described herein at least in connection with FIG. 1. In an embodiment, the redemption request is the same as the request to begin redemption 124 of the gift described herein at least in connection with FIG. 1.

At step 512 of the example process 500, the gift service generates a custom set of gift selection options using a gift selection algorithm such as the gift selection algorithm 122 described herein at least in connection with FIG. 1. In an embodiment, the gift service generates the custom set of gift selection options by applying the gift selection algorithm to the redemption request. In an embodiment, the gift service generates the custom set of gift selection options in response to the redemption request.

At step 514 of the example process 500, the gift service receives a selection of one or more gift selection options from the custom set of gift selection options generated at step 514. In an embodiment, the gift service receives the selection of the one or more gift selection options associated with the custom set of gift selections from a gift recipient such as the gift recipient 114 described herein at least in connection with FIG. 1.

At step 516 of the example process 500, the gift service updates the gift object algorithm and/or the gift selection algorithm using the redemption request, the custom set of gift selection options, and the selection made from the custom set of gift selection options.

Figure 6:
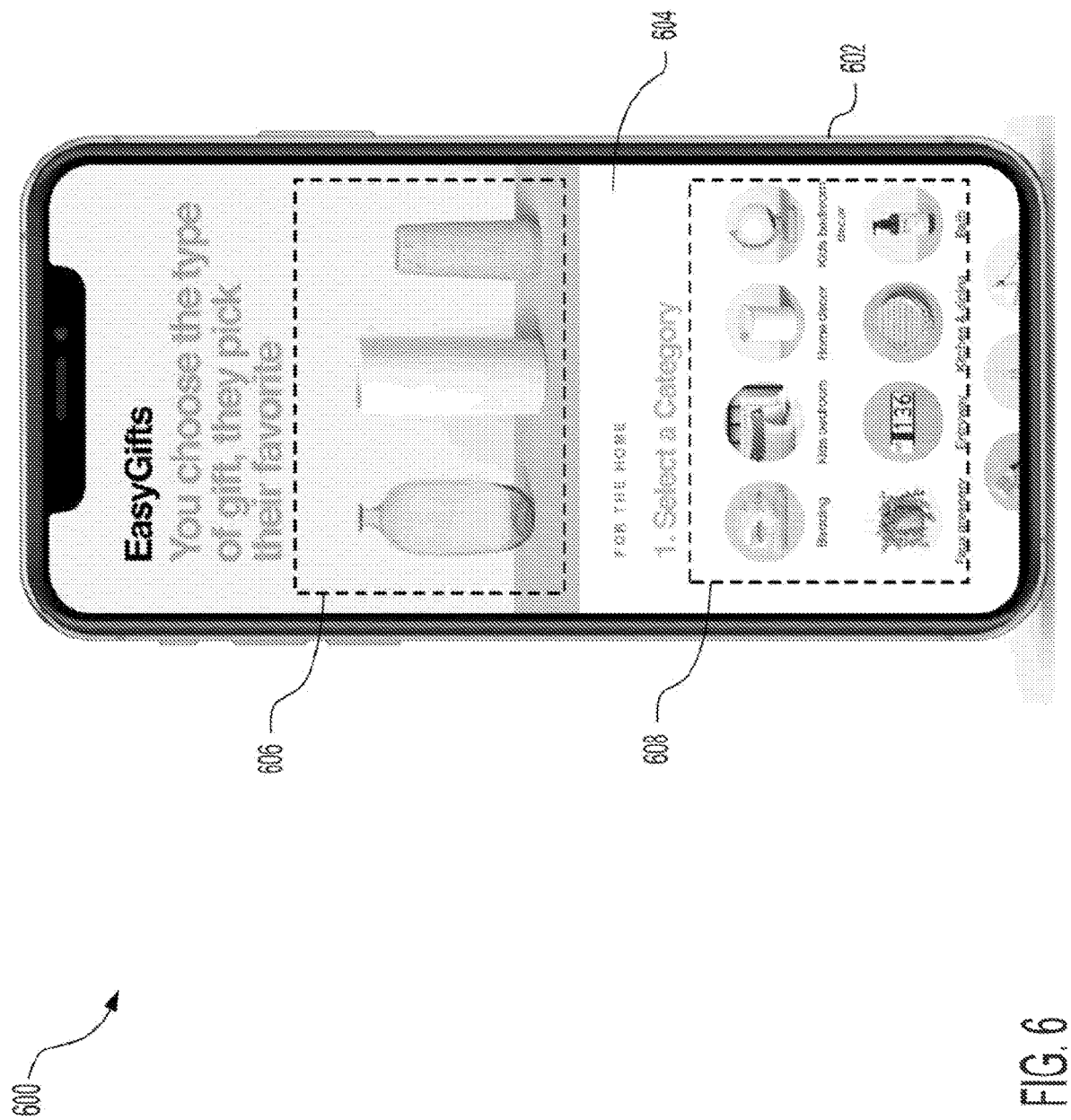
FIG. 6 shows an illustrative example of an environment in which gift categories are presented for a dynamically defined gift object in accordance with at least one embodiment.

FIG. 6 shows an illustrative example of an environment 600 in which gift categories are presented for a dynamically defined gift object in accordance with at least one embodiment. In an embodiment, a computing device 602 (which is the same as the computing device 104 and/or the same as the computing device 138, both described herein at least in connection with FIG. 1) is used to display an application 604. In an embodiment, a gift purchaser (e.g., the purchaser 102 described herein at least in connection with FIG. 1) interacts with systems of the gift service (e.g., the gift service 108, also described herein at least in connection with FIG. 1) via the computing device 602 (which is the same as the computing device 104 described herein at least in connection with FIG. 1) and using an application such as the application 604. In an embodiment, a gift recipient (e.g., the recipient 114 described herein at least in connection with FIG. 1) interacts with systems of the gift service via the computing device 602 (which is the same as the computing device 138 described herein at least in connection with FIG. 1) and using an application such as the application 604.

In an embodiment, the application 604 displays user interface elements including, but not limited to, icons, text, buttons, dropdown lists, radio buttons, check boxes, and visual canvases to convey information obtained from systems of the gift service, obtained from a third-party, and/or obtained from other sources. In an embodiment, the application 604 uses those user interface elements to obtain information from the gift recipient and/or the gift purchaser to provide the obtained information to systems of the gift service, to a third-party, and/or to other information subscribers.

In an embodiment, the application 604 receives the obtained information via a network interface (e.g., the network interface 2520 described herein at least in connection with FIG. 25) that is associated with the computing device 602 (e.g., the computing device 2502, the computing device 2524, a computing device associated with the computing resources provider 2528, and/or a merchant computing device 2536, all described herein at least in connection with FIG. 25). In an embodiment, the application 604 provides the information obtained from the gift recipient via the network interface that is associated with the computing device 602. The computing device 602 may be a desktop computer, a laptop computer, a tablet computer, a smart phone, a wearable device (e.g., a smart watch or smart glasses), a virtual reality device, an augmented reality device, or some other such device.

In the example illustrated in FIG. 6, user interface elements of the application 604 are used to display decorative elements 606 associated with a category gift such as the category gift 404 described herein at least in connection with FIG. 4. For example, the application 604 may include various decorative user interface options such as a logo of a retailer associated with the category gift. In an embodiment, the logo and/or other decorative user interface elements of the application 604 can be dynamically altered to conform to a merchant's design esthetic. For example, the logo and/or other decorative user interface elements of the application 604 may be updated to display a logo for a manufacturer, retailer, or a designer associated with the category gift. Such logos and other design elements may be used to attach a "brand" to the application 604. Such logos and other decorative design elements may be obtained from a library of such design elements maintained by the gift service.

In the example illustrated in FIG. 6, user interface elements of the application 604 are used to display an assortment of categories 608 that, for example, the gift purchaser may use to generate a gift request using systems and methods such as those described herein and the gift service may use that gift request to create and define a gift object and define gift options for that gift object on redemption also using systems and methods such as those described herein. For example, if the gift purchaser selects a category for "bedding," from the assortment of categories 608, the gift service may create a gift object based on that category and define the gift object (e.g., as a category gift) using a gift object algorithm such as the gift object algorithm 118 described herein at least in connection with FIG. 1. Similarly, the gift service may define the gift selection options for that gift object on redemption of the gift by the recipient using gift selection options selected from the "bedding" category using the gift selection algorithm. In an embodiment, the selection of a category (e.g., the bedding category) from the assortment of categories 608 may be used to set the gift object type (e.g., the gift object type 212 described herein at least in connection with FIG. 2) and to inform the purchaser intent (e.g., the purchaser intent 214 described herein at least in connection with FIG. 2) as described herein. In an embodiment, the selection of a category (e.g., the bedding category) from the assortment of categories 608 may also be used by the gift service to determine the gift object value (e.g., the gift object value 216 described herein at least in connection with FIG. 2) and/or the gift availability (e.g., the gift availability 222 described herein at least in connection with FIG. 2) using systems and methods such as those described herein.

Figure 7:
FIG. 7 shows an illustrative example of an environment in which gifts for a category gift of a dynamically defined gift object are presented in accordance with at least one embodiment.

FIG. 7 shows an illustrative example of an environment 700 in which gifts for a category gift of a dynamically defined gift object are presented in accordance with at least one embodiment. In an embodiment, the gifts for a category gift of a dynamically defined gift object described in connection with FIG. 7 are presented using a computing device such as the computing device 602 described herein at least in connection with FIG. 6 and/or using an application such as the application 604, also described herein at least in connection with FIG. 6.

In the example illustrated in FIG. 7, an application operating on a computing device presents category gifts using user interface elements such as those described herein. For example, an application 702 running on a computing device displays category gift choices to a gift purchaser (e.g., the purchaser 102 described herein at least in connection with FIG. 1) that allows the gift purchaser to select a gift category for a gift. In the example illustrated in FIG. 7, the application 702 displays category choices for different leagues (i.e., different sports) and also categories for different types of gifts (e.g., jerseys, hats, bags, and accessories, and sports balls and equipment). In an embodiment, the purchaser can use the application 702 to select the league and allow the recipient (e.g., the recipient 114 described herein at least in connection with FIG. 1) to select from the different types (e.g., jerseys, hats, bags, and accessories, and sports balls and equipment) and then the particular gift. In an embodiment, the purchaser can use the application 702 to select from the different types (e.g., jerseys, hats, bags, and accessories, and sports balls and equipment) and allow the recipient to select the league. In an embodiment, the purchaser can use the application 702 to select the league and the category type and the recipient can then select from gifts of that type and from that league. In the example illustrated in FIG. 7, the recipient has selected the type of gift (e.g., jerseys) and the recipient uses the application 704 to select the league and then the team and/or jersey type.

The example illustrated in FIG. 7 parallels the processes described herein at least in connection with FIG. 1 and FIG. 2. For example, when the purchaser uses application 702 to select "jerseys" for the recipient, that is a parallel of the purchaser 102 generating a gift request 106, the gift service 108 creating a gift object 110, and the gift service 108 defining the gift object 120 as described herein at least in connection with FIG. 1 where the gift object type 212 and the purchaser intent 214 are defined by that gift request as described herein at least in connection with FIG. 2). The presentation of the application 704 to the recipient (with the gift options for the gift) is a parallel of the gift service 108 notifying the recipient 112 and also presenting the options 128 described herein at least in connection with FIG. 1. Although not illustrated in FIG. 7, if the recipient uses the application 704 to select a jersey, that is a parallel of the processes to begin the redemption 124 and to select the options 130 described herein at least in connection with FIG. 1. This example of a dynamically defined gift object is indicative that the gift object is not defined (or finalized) until a selection has been made by the recipient.

Figure 8:
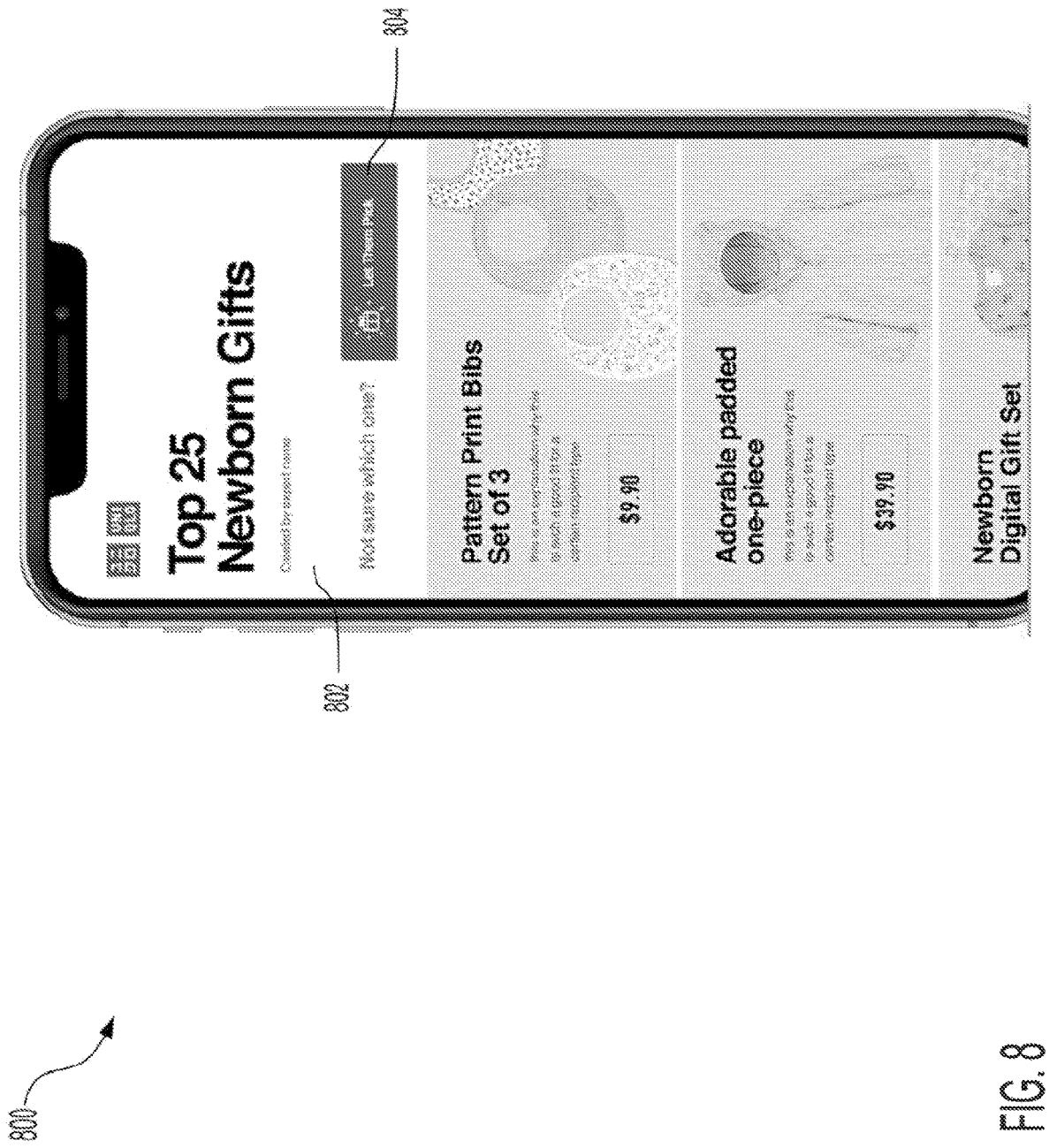
FIG. 8 shows an illustrative example of an environment in which curated gift categories for a dynamically defined gift object are presented in accordance with at least one embodiment.

FIG. 8 shows an illustrative example of an environment 800 in which curated gift categories for a dynamically defined gift object are presented in accordance with at least one embodiment. In an embodiment, the curated gift categories for a dynamically defined gift object described in connection with FIG. 8 are presented using a computing device such as the computing device 602 described herein at least in connection with FIG. 6 and/or using an application such as the application 604, also described herein at least in connection with FIG. 6.

In the example illustrated in FIG. 8, a gift curator has curated a set of newborn gifts. As used herein, a gift curator (also referred to herein as an expert) is an authority on selecting gifts of a particular category. In an embodiment, a curator associated with the gift service makes one or more recommendations for gift selection options to be included in a curated category gift. In an embodiment, a gift curator may have a reputation for selecting well-received gift selection options. For example, a famous children's designer may curate a gift subscription of children's clothing. The gift selection options of the curated category gift may be selected (in whole or in part) by the gift curator. In an embodiment, the gift curator may select all of the gifts and provide the gift selection options corresponding to these gifts. In an embodiment, the gift curator may select an initial set of gifts and the gift service may select the gift selection options from that initial set of gifts using systems and methods such as those described herein.

In an embodiment, when a gift purchaser selects a gift based around a gift curator, that selection may be included in the profile of the gift purchaser and/or the gift recipient. For example, a gift request for a curated category gift provides information about the gift purchaser and the gift recipient. A machine learning system such as the machine learning system 116 described herein at least in connection with FIG. 1 may use this information to determine which gifts to include in the set of gift selection options presented to the gift recipient (e.g., in addition to selections made by the gift curator) and the machine learning system may also use this information to determine which gifts to include in the set of gift selection options presented to other gift purchasers and/or other gift recipients with similar profiles.

In an embodiment, the gift purchaser (e.g., the purchaser 102 described herein at least in connection with FIG. 1) can use the application 802 to select a gift and/or a gift category from the curated set of gifts. In an embodiment, the purchaser can interact with the application using, for example, a button 804 to present the curated set of gifts to the recipient (e.g., the recipient 114 described herein at least in connection with FIG. 1) as a category gift, using systems and methods such as those described herein.

Figure 9:
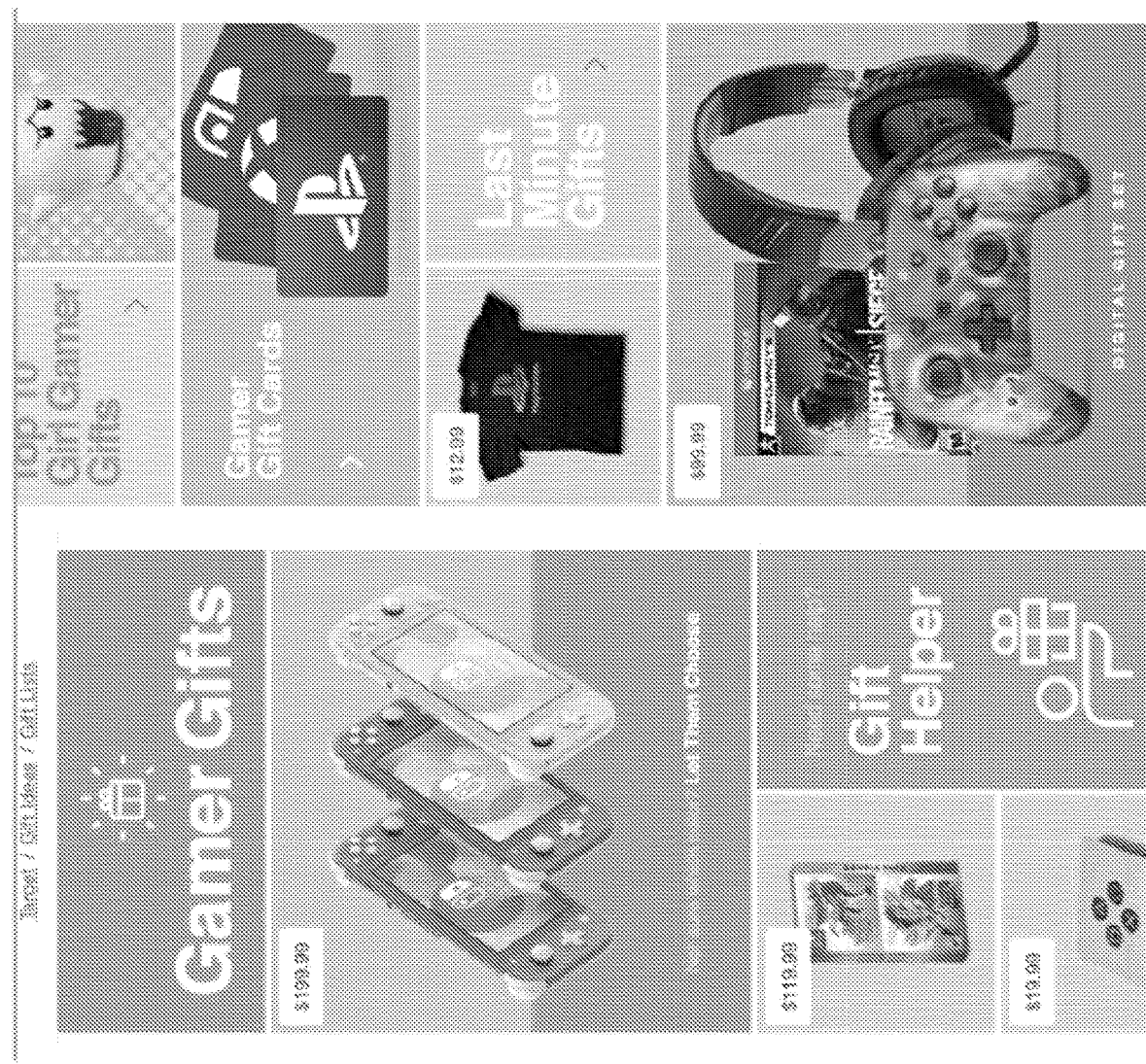
FIG. 9 shows an illustrative example of an environment in which gift options for gift categories of a dynamically defined gift object are presented in accordance with at least one embodiment.

FIG. 9 shows an illustrative example of an environment 900 in which gift selection options for gift categories of a dynamically defined gift object are presented in accordance with at least one embodiment. In an embodiment, the gift selection options for gift categories of a dynamically defined gift object described in connection with FIG. 9 are presented using a computing device such as the computing device 602 described herein at least in connection with FIG. 6 and/or using an application such as the application 604, also described herein at least in connection with FIG. 6.

In the example illustrated in FIG. 9, a number of gift categories that are related to gaming (i.e., video games) are shown including, but not limited to, game consoles, video games, gender-focused video games, video game t-shirts, video game gift cards, and video games available for digital redemption (e.g., redeemable online). In the example illustrated in FIG. 9, a gift purchaser (e.g., the purchaser 102 described herein at least in connection with FIG. 1) can use an application such as those described herein to select gifts and/or gift categories for a gift recipient (e.g., the recipient 114 described herein at least in connection with FIG. 1). As described herein, the recipient may then use an application to choose one or more gift selection options from the gift category. For example, the purchaser can choose a gift category that allows selection of a handheld gaming device using a first application and the recipient can then choose, for example, the color of the handheld gaming device when redeeming the gift.

Figure 10:
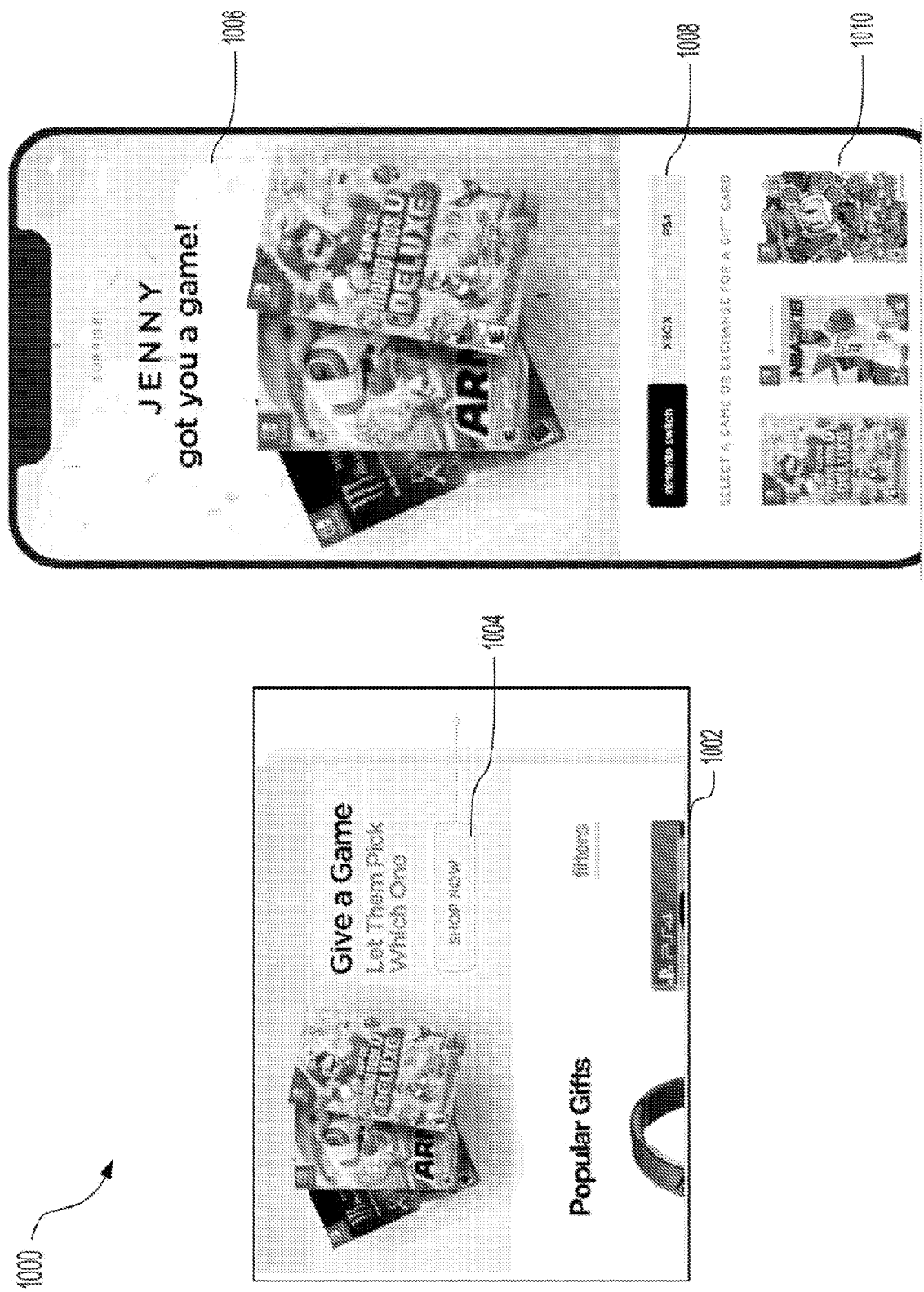
FIG. 10 shows an illustrative example of an environment in which gift options of a dynamically defined gift object are presented in accordance with at least one embodiment.

FIG. 10 shows an illustrative example of an environment 1000 in which gift selection options of a dynamically defined gift object are presented in accordance with at least one embodiment. In an embodiment, the gift selection options of a dynamically defined gift object described in connection with FIG. 10 are presented using a computing device such as the computing device 602 described herein at least in connection with FIG. 6 and/or using an application such as the application 604, also described herein at least in connection with FIG. 6.

In the example illustrated in FIG. 10, a gift category from the categories described herein at least in connection with FIG. 9 (e.g., a video game) is selected by the gift purchaser (e.g., the purchaser 102 described herein at least in connection with FIG. 1) using an application 1002. In the example illustrated in FIG. 10, when the purchaser generates the gift request using, for example, the button 1004, the recipient (e.g., the recipient described herein at least in connection with FIG. 1) can use the application 1006 to select a category sub-type (e.g. the video game platform) using a button 1008 and then select the gift 1010 (e.g., the video game for that video game platform) from the available choices using systems and methods such as those described herein.

Figure 11:
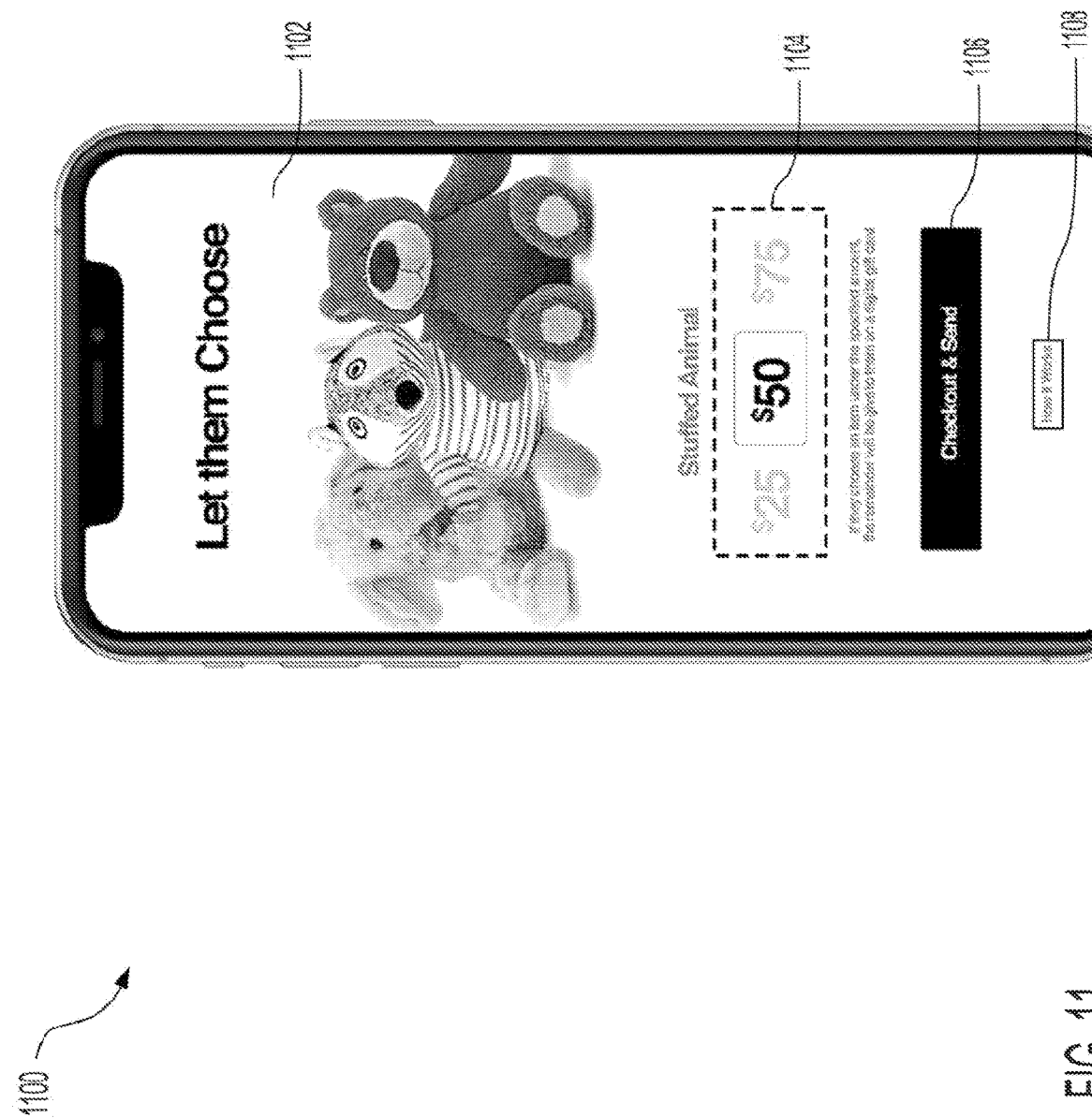
FIG. 11 shows an illustrative example of an environment in which gift options for a selected gift value of a dynamically defined gift object are presented in accordance with at least one embodiment.

FIG. 11 shows an illustrative example of an environment 1100 in which gift selection options for a selected gift value of a dynamically defined gift object are presented in accordance with at least one embodiment. In an embodiment, the gift selection options for a selected gift value of a dynamically defined gift object described in connection with FIG. 11 are presented using a computing device such as the computing device 602 described herein at least in connection with FIG. 6 and/or using an application such as the application 604, also described herein at least in connection with FIG. 6.

In the example illustrated in FIG. 11, an application 1102 is used by the gift purchaser (e.g., the purchaser 102 described herein at least in connection with FIG. 1) to define a gift value (e.g., the gift object value 216 described herein at least in connection with FIG. 2) using user interface elements 1104 of the application 1102. In the example illustrated in FIG. 11, a gift category has been selected (e.g., "stuffed animals") and the gift value is used to further narrow the gift selection options for the gift object using systems and methods such as those described herein. When the purchaser uses, for example, a button 1106 to generate the gift request (e.g., the gift request 106 described herein at least in connection with FIG. 1), the category gift is presented to the recipient (e.g., the recipient 114 described herein at least in connection with FIG. 1). In the example illustrated in FIG. 11, a button 1108 is presented to the purchaser to allow the purchaser to obtain more information about the gifts, the gift purchase process, or other such aspects of dynamically defined gift objects provided by a gift service.

Figure 12:
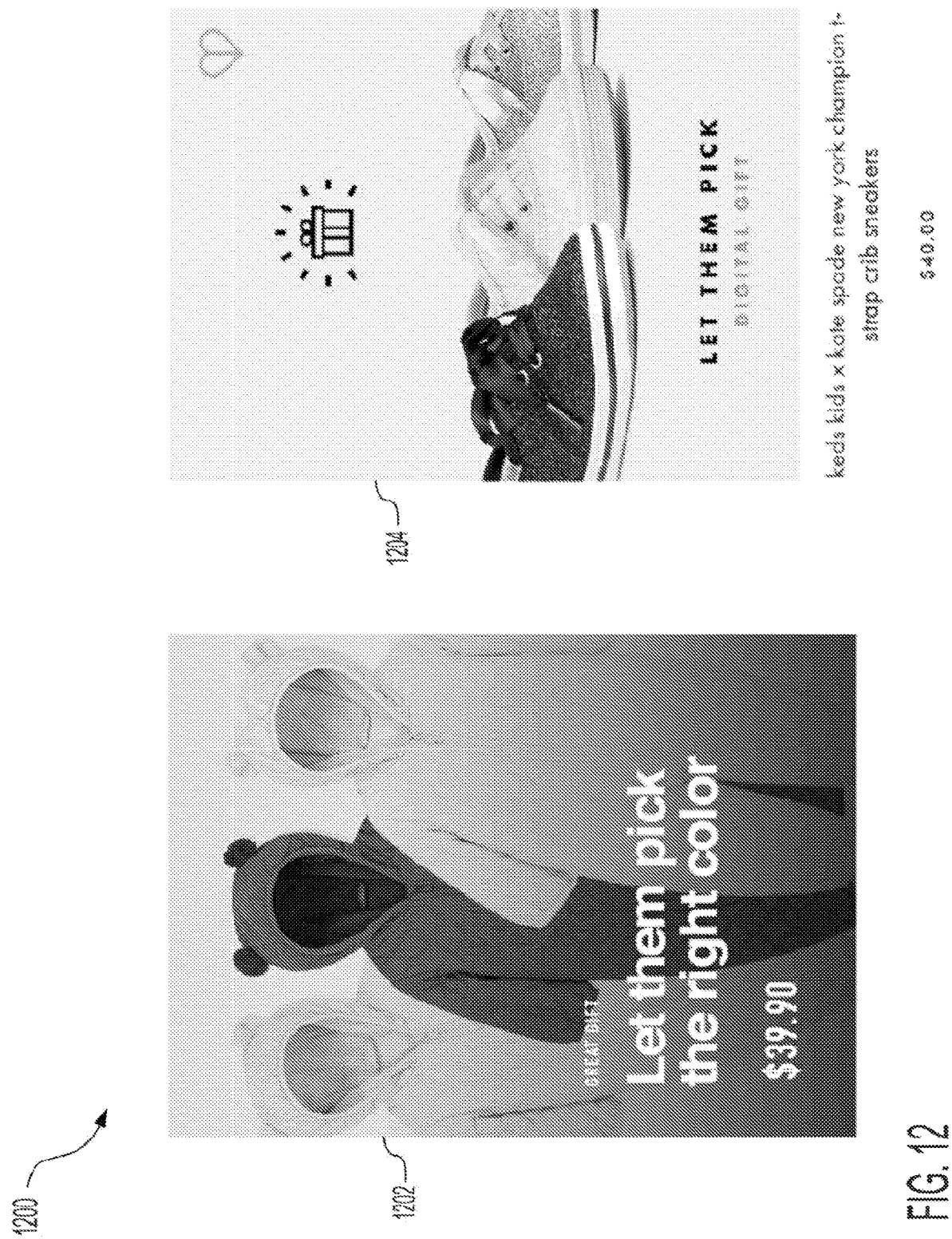
FIG. 12 shows an illustrative example of an environment in which multiple gift options of a dynamically defined gift object are presented in accordance with at least one embodiment.

FIG. 12 shows an illustrative example of an environment 1200 in which multiple gift selection options of a dynamically defined gift object are presented in accordance with at least one embodiment. In an embodiment, the multiple gift selection options of a dynamically defined gift object described in connection with FIG. 12 are presented using a computing device such as the computing device 602 described herein at least in connection with FIG. 6 and/or using an application such as the application 604, also described herein at least in connection with FIG. 6.

In the example illustrated in FIG. 12, an application is used by a gift purchaser (e.g., the purchaser 102 described herein at least in connection with FIG. 1) to select a category gift to send to a gift recipient (e.g., the recipient 114 described herein at least in connection with FIG. 1) and then the gift recipient can use an application to redeem the category gift using systems and methods such as those described herein. For example, the gift purchaser may select a category gift 1202 of baby "onesies" and let the recipient choose the color. In another example, the gift purchaser can select a category gift 1204 of children's sneakers and let the recipient choose the maker, the color, the style, etc.

Figure 13:
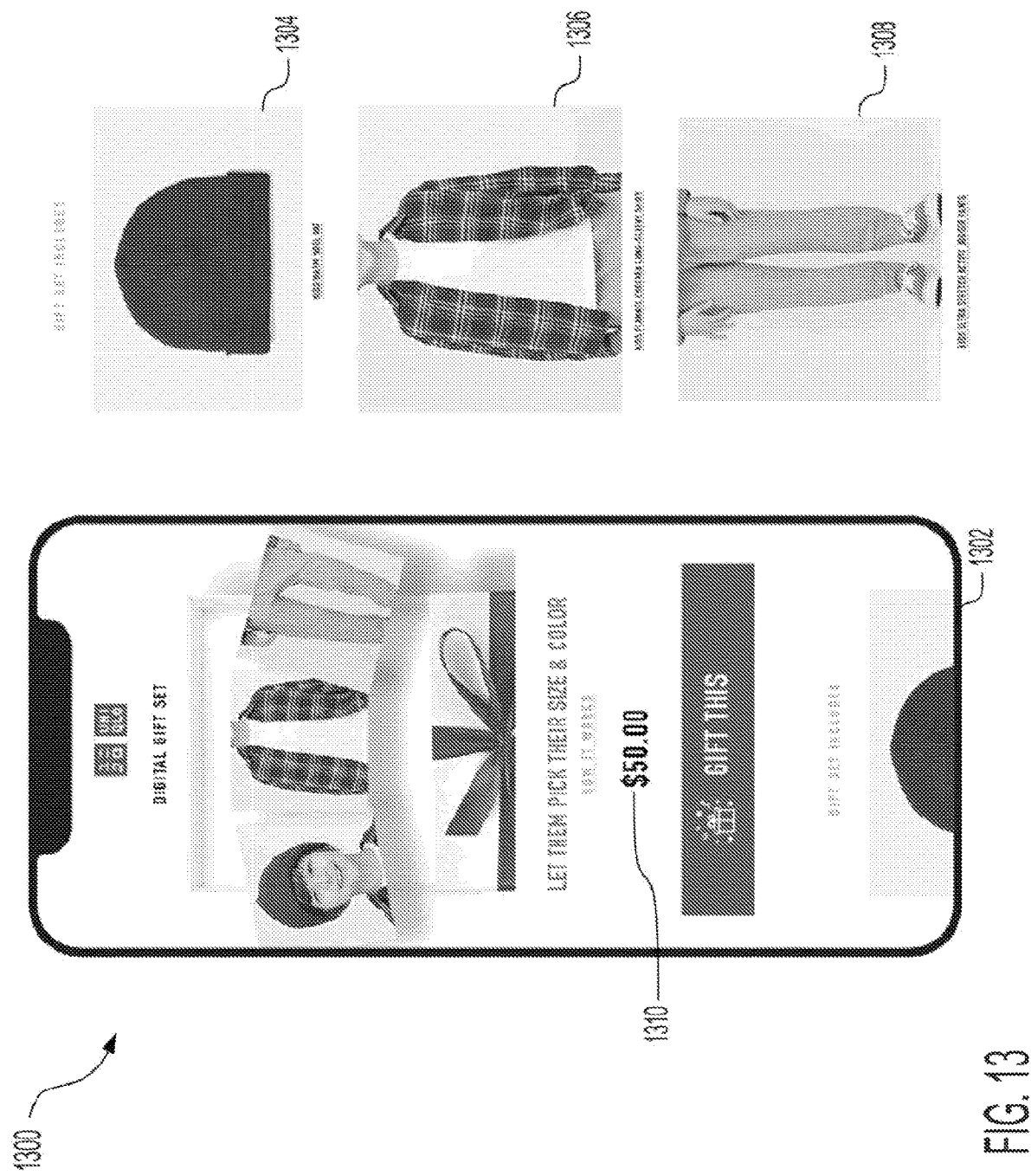
FIG. 13 shows an illustrative example of an environment in which gift options for a bundled gift of a dynamically defined gift object are presented in accordance with at least one embodiment.

FIG. 13 shows an illustrative example of an environment 1300 in which gift selection options for a bundled gift of a dynamically defined gift object are presented in accordance with at least one embodiment. In an embodiment, the gift selection options for a bundled gift of a dynamically defined gift object described in connection with FIG. 13 are presented using a computing device such as the computing device 602 described herein at least in connection with FIG. 6 and/or using an application such as the application 604, also described herein at least in connection with FIG. 6.

In the example illustrated in FIG. 13, an application 1302 is used to display a bundled gift (e.g., the bundled gift 304 described herein at least in connection with FIG. 3) that includes, for example, a hat 1304, a shirt 1306, and a pair of pants 1308. In the example illustrated in FIG. 13, the gift purchaser (e.g., the gift purchaser 102 described herein at least in connection with FIG. 1) uses the application 1302 to select a bundled gift with a cost 1310 of fifty dollars. As described herein the gift object may be created and/or defined with a gift object value (e.g., the gift object value 216 described herein at least in connection with FIG. 2) of fifty-dollars although as also described herein, that gift object value may be mutable and result in the recipient (e.g., the recipient 114 described herein at least in connection with FIG. 1) redeeming a gift bundle with merchandise that is worth less than fifty-dollars, worth exactly fifty-dollars, or worth more than fifty dollars as described herein.

Figure 14:
FIG. 14 shows an illustrative example of an environment in which gift personalization options for a dynamically defined gift object are presented in accordance with at least one embodiment.

FIG. 14 shows an illustrative example of an environment 1400 in which gift personalization options for a dynamically defined gift object are presented in accordance with at least one embodiment. In an embodiment, the gift personalization options for a dynamically defined gift object described in connection with FIG. 14 are presented using a computing device such as the computing device 602 described herein at least in connection with FIG. 6 and/or using an application such as the application 604, also described herein at least in connection with FIG. 6.

In the example illustrated in FIG. 14, when a gift purchaser (e.g., the gift purchaser 102 described herein at least in connection with FIG. 1) uses an application to select a gift associated with a dynamically defined gift object using systems and methods such as those described herein, the gift purchaser may also use the application to personalize the gift and/or the gift notification. In an embodiment, this personalization can include ways to deliver the gift and/or the gift notification to the gift recipient (e.g., the gift recipient 114 described herein at least in connection with FIG. 1), greetings to include with the notification (animated, pre-recorded, dynamically generated, etc.), messages to include with the notification, and so on. As may be contemplated, these personalizations of the gift and/or the gift notification are illustrative examples and other personalizations of the gift and/or the gift notification may be considered as within the scope of the present disclosure.

FIG. 15 shows an illustrative example of an environment 1500 in which outfit options for a bundled gift of a dynamically defined gift object are presented in accordance with at least one embodiment. In an embodiment, the outfit options for a bundled gift of a dynamically defined gift object described in connection with FIG. 15 are presented using a computing device such as the computing device 602 described herein at least in connection with FIG. 6 and/or using an application such as the application 604, also described herein at least in connection with FIG. 6.

In the example illustrated in FIG. 15, various outfits with various values are presented as gift selection options for a category gift, where each of the gift selection options may include a bundled gift. The example illustrated in FIG. 15 illustrates that a dynamically defined gift object may be a single gift, a bundled gift, or a category gift as described herein, but additionally, that a dynamically defined gift object may also be a hybrid of those gift types (e.g., a category gift where each of the gifts is a bundled gift or a bundled gift where each of the items in the bundle is selected from a category). For example, as described herein at least in connection with FIG. 3, a bundled gift of a child's outfit can include a "hat" category, a shirt category, and a pants category.

In an embodiment, the outfits are presented to a gift purchaser (e.g., the gift purchaser 102 described herein at least in connection with FIG. 1) using an application such as those described herein. In the example illustrated in FIG. 15, the gift purchaser selects the outfits from categories (e.g., for boys, for girls, or for either). In such an example, a gift recipient (e.g., the recipient 114 described herein at least in connection with FIG. 1) may use an application to choose the gift from the gift selection options presented by the outfit using systems and methods such as those described herein (e.g., to choose the size and/or color of the items in the bundled gift represented by the outfit). In an embodiment, the outfits are presented to the gift recipient without a selection from the gift purchaser, so that the gift recipient can select the gift category (e.g., for boys, for girls, or for either) and the outfits (e.g., as shown in FIG. 15) as well as the size and/or the color of the items in the bundled gift represented by the outfit.

In the example illustrated in FIG. 15, the purchaser and/or the recipient is presented with a gift selection option for a gift card which the recipient can use to receive other items (e.g., not a child's outfit) in lieu of the outfit. In an embodiment, the gift card is a physical gift card (e.g., the physical gift card 2204 described herein at least in connection with FIG. 22). In an embodiment, the gift card is a virtual gift card (e.g., an electronic gift card). In an embodiment, the gift card is a credit applied to an account associated with the gift recipient. In an embodiment, a gift card may represent some alternative and/or future value of the gift. For example, the gift recipient may apply the value of the current gift to a future gift, thereby increasing the value of future gift and, correspondingly, increasing the range of available gifts for the future gift. In such an embodiment, the value of the gift may remain mutable so that the applied value (e.g., to the future gift) may increase or decreased based on factors such as those described herein.

Figure 16:
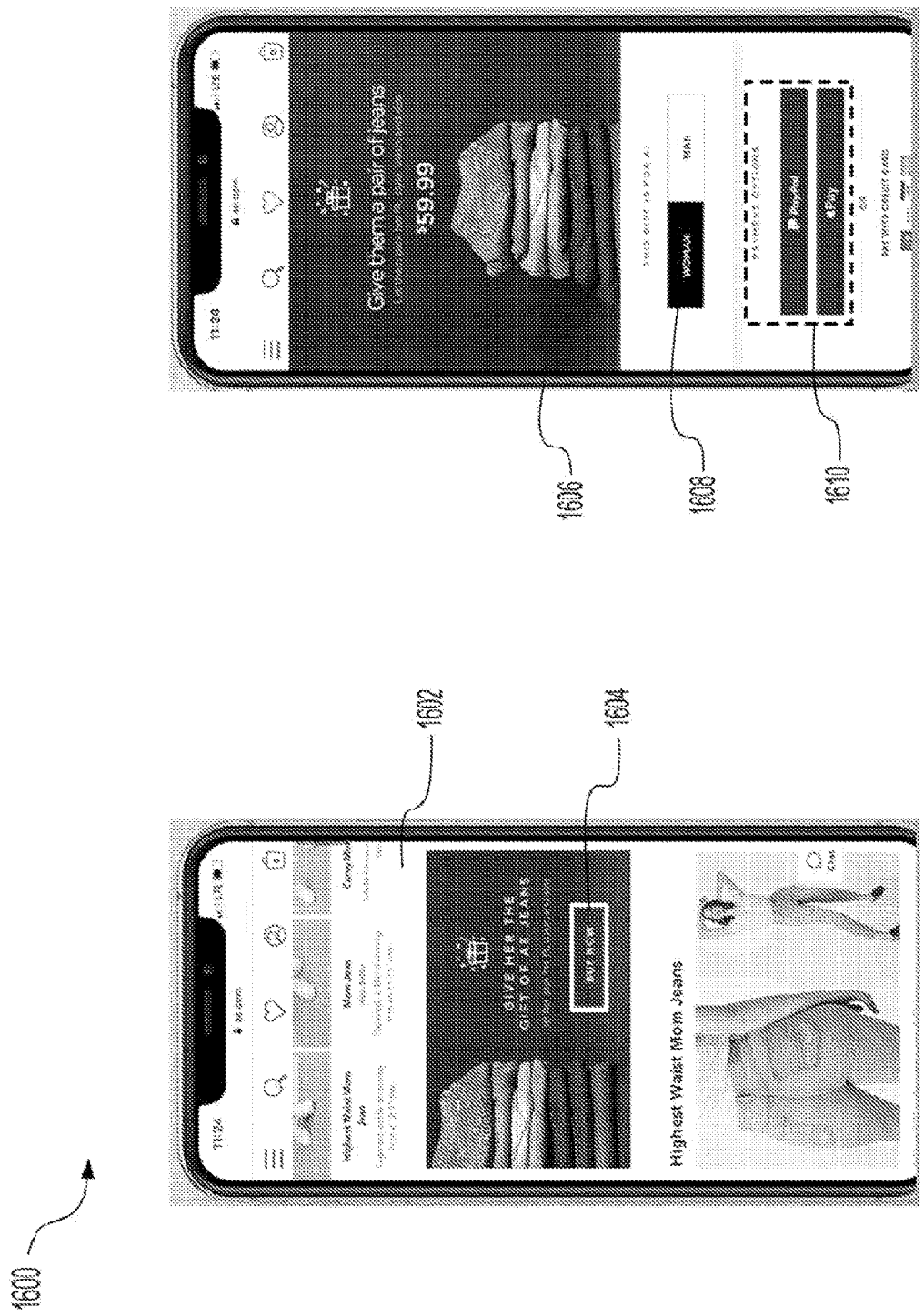
FIG. 16 shows an illustrative example of an environment in which a category gift of a dynamically defined gift object is presented in accordance with at least one embodiment.

FIG. 16 shows an illustrative example of an environment 1600 in which a category gift of a dynamically defined gift object is presented in accordance with at least one embodiment. In an embodiment, the category gift of a dynamically defined gift object described in connection with FIG. 16 is presented using a computing device such as the computing device 602 described herein at least in connection with FIG. 6 and/or using an application such as the application 604, also described herein at least in connection with FIG. 6.

In the example illustrated in FIG. 16, options for defining a category gift are presented to a gift purchaser (e.g., the purchaser 102 described herein at least in connection with FIG. 1) using an application 1602. The example illustrated shows an application for defining a category gift of a pair of jeans, with various categories of jeans displayed for the gift purchaser to select. The application 1602 may also include a button 1604 that, when selected, generates a gift request such as the gift request 106 described herein at least in connection with FIG. 1. The example illustrated in FIG. 16 also shows options for defining the category gift to the gift purchaser using an application 1606, which may be the same as the application 1602. The different embodiment of the application for defining a category gift of a pair of jeans includes user interface elements 1608 for the gift purchaser to select a gender for the recipient and also user interface elements 1610 for the gift purchaser to select a payment method for the category gift. In an embodiment, elements from the application 1602 and the application 1606 can be combined to allow the gift purchaser to, for example, select the gender for the recipient first (e.g., using the user interface elements 1608), then choose from the various categories of jeans (e.g., using the button 1604), and then choose a payment method (e.g., using the user interface elements 1610). In an embodiment (not illustrated in FIG. 16) a gift recipient (e.g., the gift recipient 114 described herein at least in connection with FIG. 1) may use an application to perform some of the operations for defining the gifts in the category gift including, but not limited to, selecting the gender for the recipient and/or choosing from the various categories of jeans.

Figure 17:
FIG. 17 shows an illustrative example of an environment in which style options for a category gift of a dynamically defined gift object are presented in accordance with at least one embodiment.

FIG. 17 shows an illustrative example of an environment 1700 in which style options for a category gift of a dynamically defined gift object are presented in accordance with at least one embodiment. In an embodiment, the style options for a category gift of a dynamically defined gift object described in connection with FIG. 17 are presented using a computing device such as the computing device 602 described herein at least in connection with FIG. 6 and/or using an application such as the application 604, also described herein at least in connection with FIG. 6. The example illustrated in FIG. 17, shows a different method for defining the gifts of a category gift using style options. This method for defining the gifts of a category gift may be used in addition to the methods described herein (e.g., selecting the gender for the recipient first using, for example, the user interface elements 1608 and/or choosing from the various categories of jeans using, for example, the button 1604 both described herein at least in connection with FIG. 16). This method for defining the gifts of a category gift may also be used instead of the methods described herein (e.g., those described herein at least in connection with FIG. 16).

Figure 18:
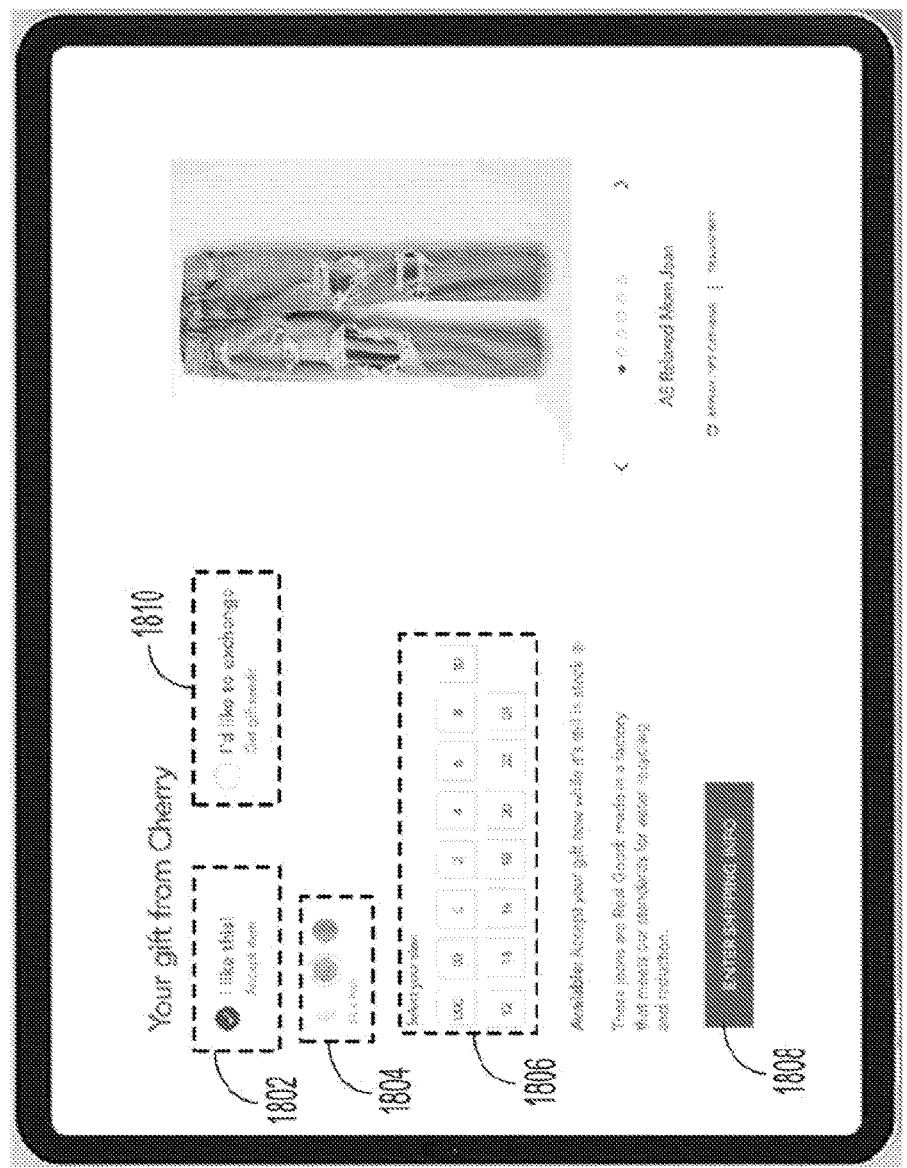
FIG. 18 shows an illustrative example of an environment in which gift and receipt options for a category gift of a dynamically defined gift object are presented in accordance with at least one embodiment.

FIG. 18 shows an illustrative example of an environment 1800 in which gift selection and receipt options for a category gift of a dynamically defined gift object are presented in accordance with at least one embodiment. In an embodiment, the gift selection and receipt options for a category gift of a dynamically defined gift object described in connection with FIG. 18 are presented using a computing device such as the computing device 602 described herein at least in connection with FIG. 6 and/or using an application such as the application 604, also described herein at least in connection with FIG. 6.

In the example illustrated in FIG. 18, a category gift where the gift category is jeans (e.g., as described herein at least in connection with FIG. 16 and FIG. 17) is presented to a gift recipient such as the gift recipient 114 described herein at least in connection with FIG. 1. The example illustrated in FIG. 18 includes user interface elements 1802 to accept the gift, user interface elements 1804 to select the color of the gift (i.e., the jeans), user interface elements 1806 to select the size, additional information about the gift, a picture of the gift, information about the factory where the gift is made, and other such functionality. In an embodiment, the application shown in the example illustrated in FIG. 18 includes user interface elements 1808 to enter the shipping information for the recipient. In an embodiment, the application includes user interface elements 1810 to not accept the gift as described herein. For example, as described herein, the gift recipient may want to exchange the gift for a gift card, or may want select gifts from a different category (e.g., a different type of jeans), or may want select gifts from a different retailer, or may want to donate the gift to another, or may want to perform some other such action with respect to the category gift.

Figure 19:
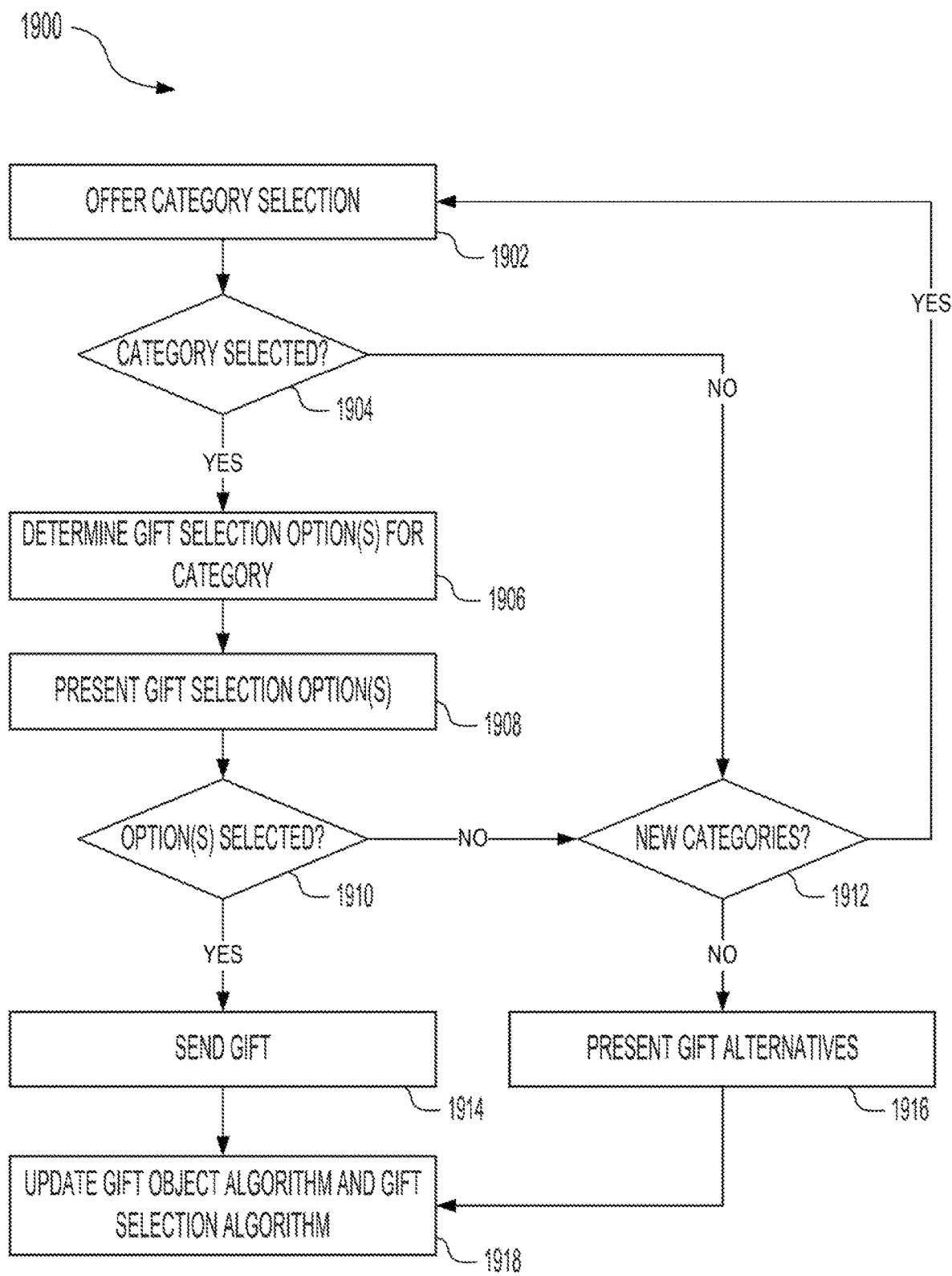
FIG. 19 shows an illustrative example of a process for generating and presenting category gifts of a dynamically defined gift object in accordance with at least one embodiment.

FIG. 19 shows an illustrative example of a process 1900 for generating and presenting category gifts of a dynamically defined gift object in accordance with at least one embodiment. Components of a gift service such as the gift service 108 described herein at least in connection with FIG. 1 may perform the process 1900 illustrated in FIG. 19.

At step 1902 of the example process 1900, components of the gift service offer a category gift selection by, for example, displaying a user interface that allows a user to choose a gift category. In an embodiment, the components of the gift service offer the category gift selection to a gift purchaser (e.g., the purchaser 102 described herein at least in connection with FIG. 1) using systems and methods such as those described herein. In an embodiment, the components of the gift service offer the category gift selection to a gift recipient (e.g., the recipient 114 described herein at least in connection with FIG. 1) using systems and methods such as those described herein.

At step 1904 of the example process 1900, components of the gift service determine whether the user has selected a gift category. If, at step 1904, the components of the gift service determine that the user did not select a gift category (the "NO" branch), the example process continues at step 1912, described in detail below.

If, at step 1904, the components of the gift service determine that the user did select a gift category (the "YES" branch), at step 1906 of the example process 1900, components of the gift service determine the gift selection options for the category gift (e.g., the components of the gift service define the gift selection options 126 as described herein at least in connection with FIG. 1). At step 1908 of the example process 1900, components of the gift service present the gift selection options determined at step 1906 (e.g., present the gift options 128 described herein as described herein at least in connection with FIG. 1).

At step 1910 of the example process 1900, components of the gift service determine whether the user selected one or more gift selection options from the gift selection options presented at step 1908. If at step 1910, the components of the gift service determine that the user did not select any gift selection options from those presented to the user (the "NO" branch), the example process continues at step 1912, described in detail below.

If at step 1910, the components of the gift service determine that the user did select one or more gift selection options (the "YES" branch), at step 1914 components of the gift service send the gift (which may be associated with the one or more gift selection options selected by the user) to the gift recipient using systems and methods such as those described herein. At step 1918 of the example process 1900, components of the gift service update the gift object algorithm (e.g., the gift object algorithm 118 described herein at least in connection with FIG. 1) and also update the gift selection algorithm (e.g., the gift selection algorithm 122, also described herein at least in connection with FIG. 1) using systems and methods such as those described herein.

At step 1912 of the example process 1900, components of the gift service determine whether to present new gift categories to the user. In an embodiment, the components of the gift service may determine whether to present new gift categories to the user if the user did not choose a category (e.g., at step 1904). In an embodiment, the components of the gift service may determine whether to present new gift categories to the user if the user did not select any gift selection options from the presented gift category (e.g., at step 1910). Although not illustrated in FIG. 19, the steps 1902-1912 of the example process 1900 may happen in a different order. For example, in an embodiment, the category can be pre-selected and the gift selection options pre-determined for the category. In such an embodiment, the example process 1900 may begin with step 1908, the presentation of the possible gift selections options that may be presented to a recipient with the gift. In such an embodiment, steps 1902-1906 may occur after step 1912, where components of the gift service determine whether to present new gift categories to the user.

If at step 1912, the components of the gift service determine to present new gift categories to the user (the "YES" branch), the example process 1900 may return to step 1902 to offer the new gift categories. If at step 1912, the components of the gift service determine to not present new gift categories to the user (the "NO" branch), at step 1916, components of the gift service may present a set of gift alternatives to the user (e.g., a gift card, a refund to the purchaser, a different retailer, an exchange, etc.). The example process 1900 then continues to step 1918 to update the gift object algorithm and the gift selection algorithm, as described herein. Although not illustrated in FIG. 19, in an embodiment, step 1918 of the example process 1900 (to update the gift object algorithm and the gift selection algorithm) may occur first (i.e., before step 1902), during the execution of the example process 1900, or last (as illustrated). Similarly, step 1918 of the example process 1900 (to update the gift object algorithm and the gift selection algorithm) can, in some embodiments, execute continuously and/or in real-time so that the gift object algorithm and/or the gift selection algorithm is updated while the example process 1900 is executing.

Although not illustrated in FIG. 19, steps of the example process 1900 may be performed in parallel and/or in different orders. Additionally, though not illustrated in FIG. 19, in an embodiment, the example process 1900 is reentrant in that the process begins at step 1902 after completing step 1918.

Figure 20:
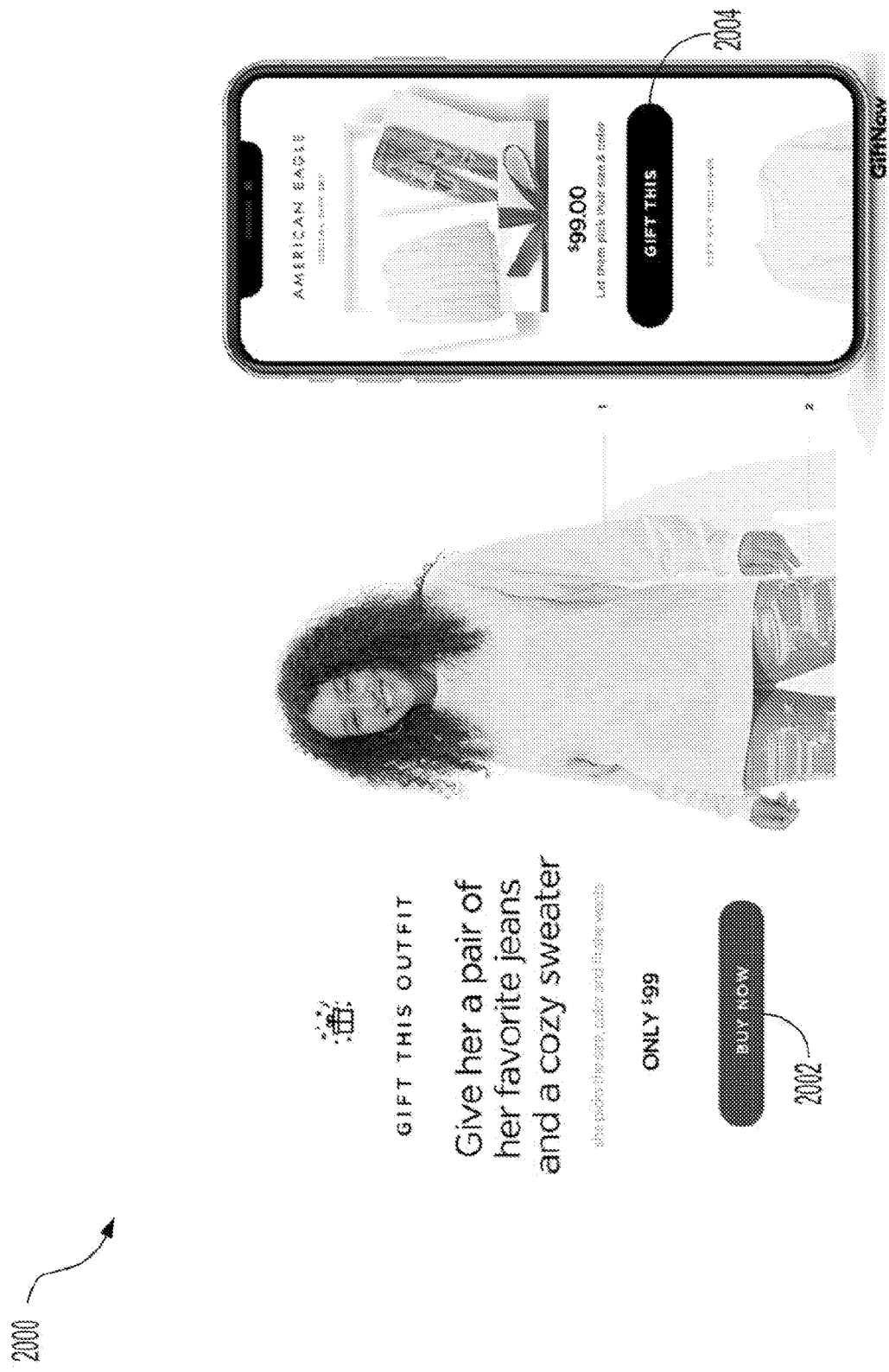
FIG. 20 shows an illustrative example of an environment in which bundled gifts of a dynamically defined gift object are presented in accordance with at least one embodiment.

FIG. 20 shows an illustrative example of an environment 2000 in which bundled gifts of a dynamically defined gift object are presented in accordance with at least one embodiment. In an embodiment, the bundled gifts of a dynamically defined gift object described in connection with FIG. 20 are presented using a computing device such as the computing device 602 described herein at least in connection with FIG. 6 and/or using an application such as the application 604, also described herein at least in connection with FIG. 6.

In the example illustrated in FIG. 20, a bundled gift (e.g., a gift of a pair of jeans and a sweater) with a determined price is selected by a gift purchaser (e.g., the purchaser 102 described herein at least in connection with FIG. 1) for purchase. In the example illustrated in FIG. 20, a first option 2002 to "buy now" is presented using a first display method (e.g., using an application such as those described herein) and second option 2004 to "gift this" is presented using a second display method (e.g., using an application such as those described herein). In an embodiment, both the first display method and the second display method can initiate a gift request such as the gift request 106 described herein at least in connection with FIG. 1. In an embodiment, both the first display method and the second display method can also at least cause the gift object to be defined, the gift selection options to be defined, and the gift selection options to be presented to a gift recipient (e.g., the recipient 114 described herein at least in connection with FIG. 1). In an embodiment, the bundled gift options are displayed with branding information (e.g., for a particular retailer) using systems and methods such as those described herein (e.g., with logos and/or other decorative elements associated with the particular retailer).

Figure 21:
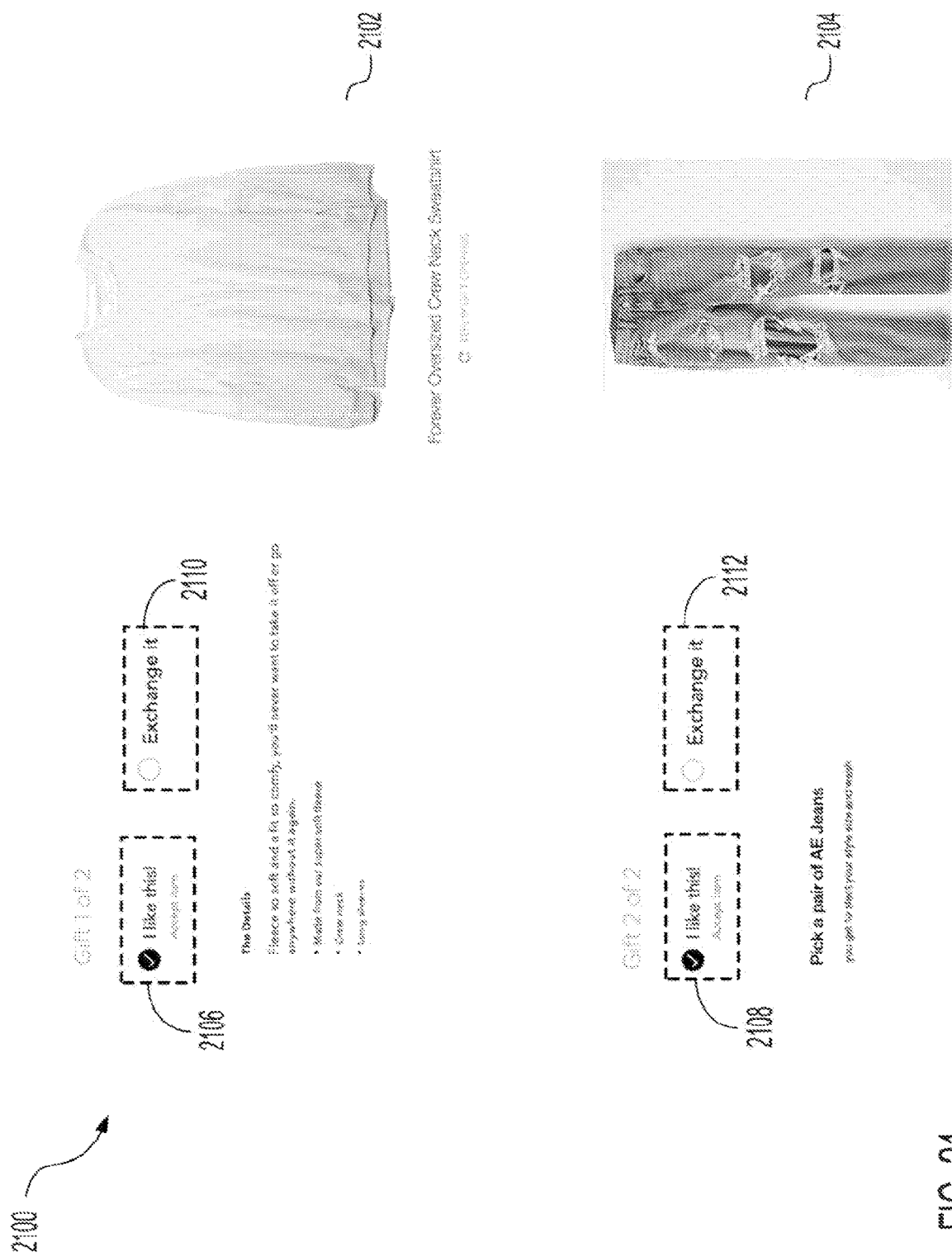
FIG. 21 shows an illustrative example of an environment in which gifts and receipt options for a bundled gift of a dynamically defined gift object are presented in accordance with at least one embodiment.

FIG. 21 shows an illustrative example of an environment 2100 in which gift selection options and receipt options for a bundled gift of a dynamically defined gift object are presented in accordance with at least one embodiment. In an embodiment, the gift selection options and receipt options for a bundled gift of a dynamically defined gift object described in connection with FIG. 21 are presented using a computing device such as the computing device 602 described herein at least in connection with FIG. 6 and/or using an application such as the application 604, also described herein at least in connection with FIG. 6.

In the example illustrated in FIG. 21, a bundled gift where the first gift type 2102 is for a sweater and the second gift type 2104 is for a pair of jeans is presented to a gift recipient (e.g., the gift recipient 114 described herein at least in connection with FIG. 1). See, for example, the bundled gift described herein at least in connection with FIG. 20. In the example illustrated in FIG. 21, an application such as those described herein includes user interface elements 2106, 2108 to accept one or both of the gifts of the bundled gift and also includes user interface elements 2110, 2112 to not accept one or both of the gifts of the bundled gift. For example, as described herein, the gift recipient may want to exchange one or both of the gifts of the bundled for a gift card, or select gifts from a different category (e.g., a different type of jeans and/or a different sweater), or select gifts from a different retailer for one or both of the gifts in the bundled gift, or donate one or both of the gifts, or may want to perform some other such action with respect to the gifts of the bundled gift.

Although not illustrated in FIG. 21, in an embodiment, the application used to display the bundled gift options includes user interface elements to select the color of the gifts, select the size of the gifts, display additional information about the gift, display information about the factory where the gift is made, and other such functionality. Although also not illustrated in FIG. 21, in an embodiment, the application shown in the example illustrated in FIG. 21 also includes user interface elements to enter the shipping information for the recipient and/or other such information needed to receive the gifts.

Figure 22:
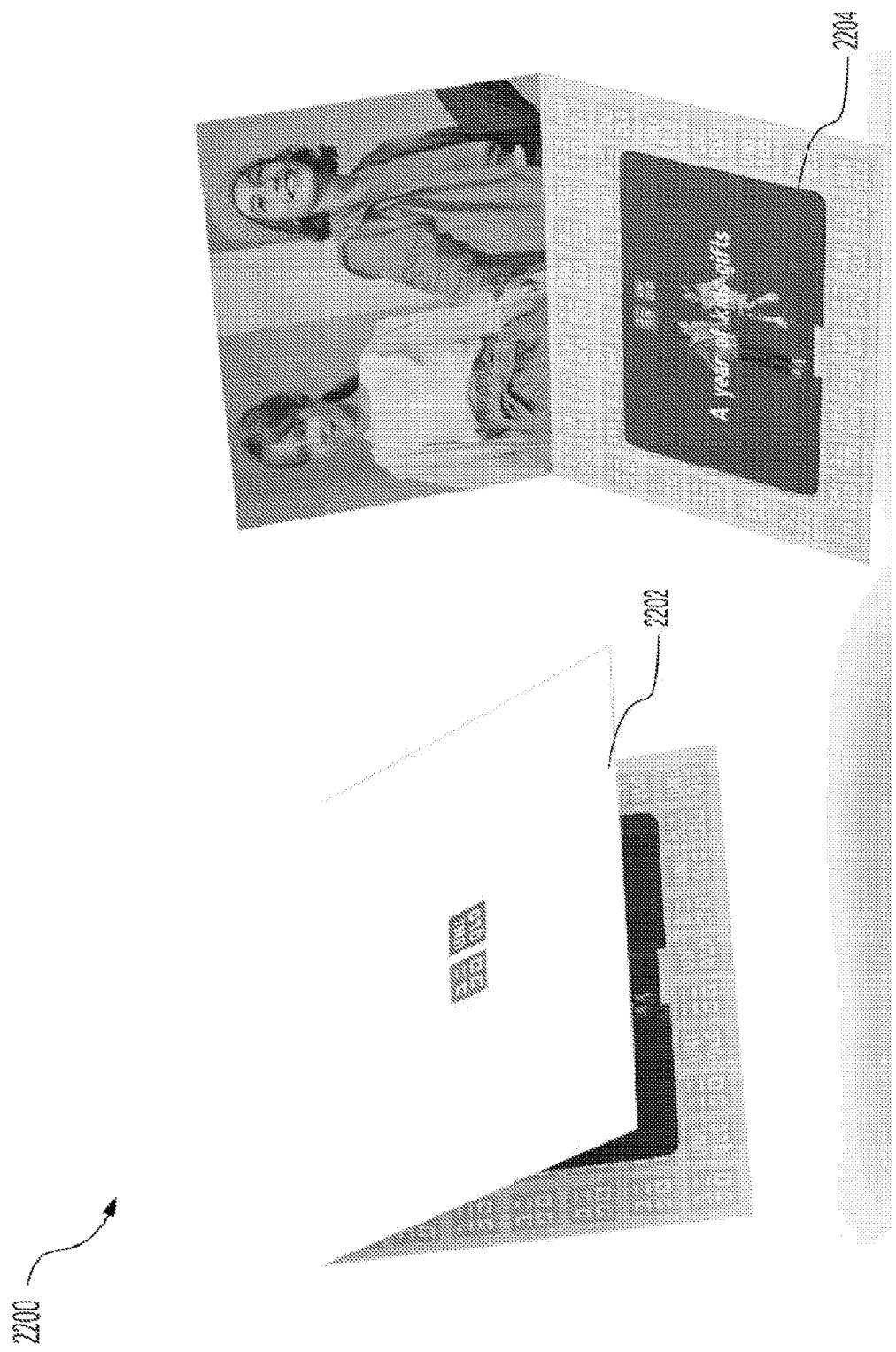
FIG. 22 shows an illustrative example of an environment in which a gift card associated with a dynamically defined gift object is presented in accordance with at least one embodiment.

FIG. 22 shows an illustrative example of an environment 2200 in which a gift card associated with a dynamically defined gift object is presented in accordance with at least one embodiment. In the example illustrated in FIG. 22, a gift card such as those described herein is shown. In an embodiment, the gift card is a physical gift card such as those described herein. For example, a physical gift card may be presented to a gift recipient that represents a dynamically defined gift object. In an embodiment, the gift card represents a category gift such as those described herein that may be presented to a gift recipient. In an embodiment, the gift card represents a bundled gift such as those described herein that may be presented to a gift recipient. In the example illustrated in FIG. 22, the gift card is presented in a gift card envelope 2202 that may include a logo, advertising links, and other such branding information (i.e., such as the branding information described herein). In the example illustrated in FIG. 22, the gift card includes a physical gift card 2204 such as those described herein.

In an illustrative example, a gift purchaser (which is the same as the purchaser 102 described herein at least in connection with FIG. 1) may purchase a physical gift card 2204 that represents a category gift, or that represents a bundled gift, or that represents some other such dynamically defined gift object. The purchaser may provide the physical gift card 2204 to a gift recipient (which is the same as the gift recipient 114 described herein at least in connection with FIG. 1). The gift recipient may then use the physical gift card to initiate the gift process (e.g., submit a gift request to a gift service such as the gift service 108 described herein at least in connection with FIG. 1) using the systems and methods such as those described herein.

Figure 23:
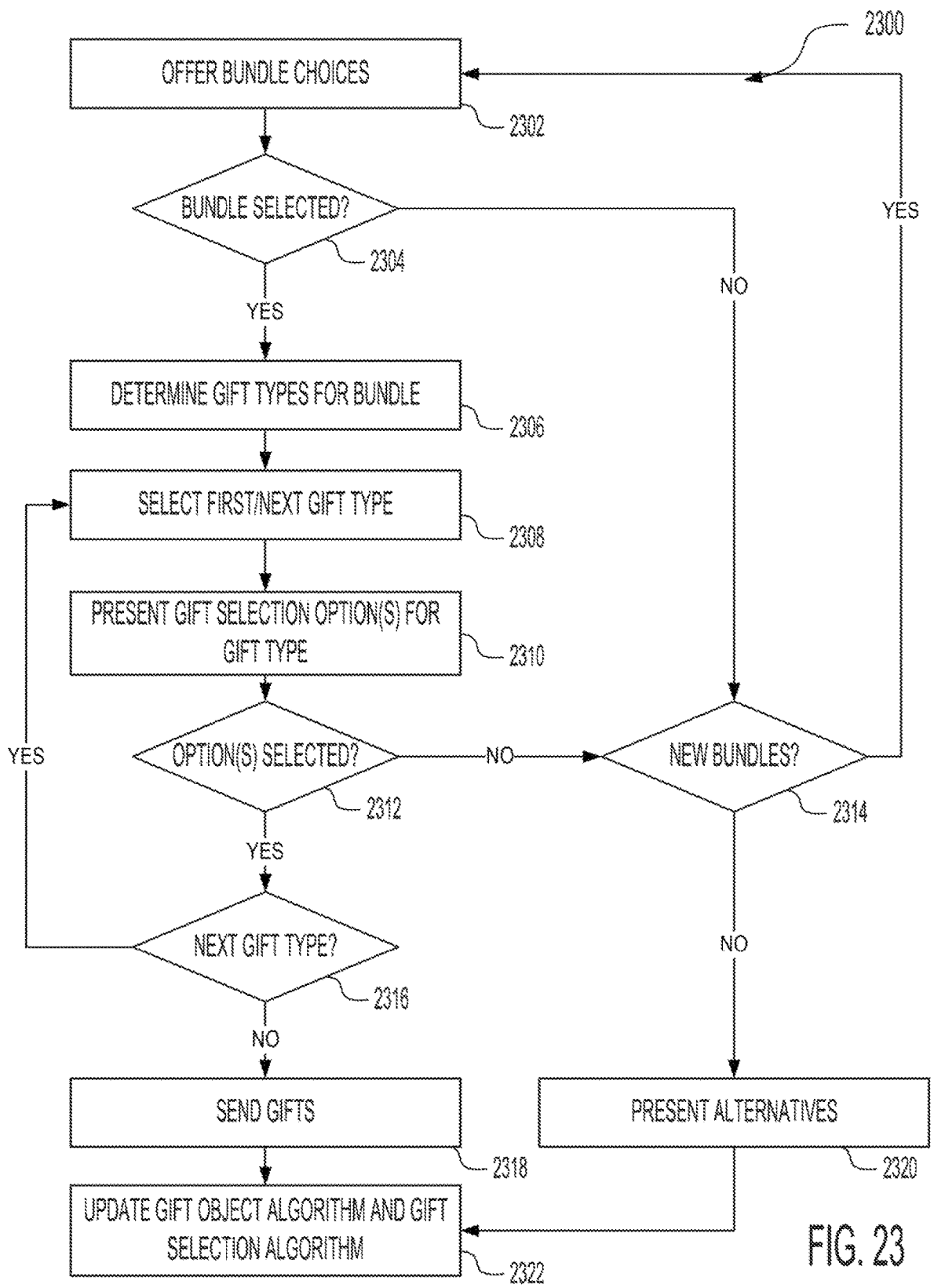
FIG. 23 shows an illustrative example of a process for generating and presenting bundled gifts of a dynamically defined gift object in accordance with at least one embodiment.

FIG. 23 shows an illustrative example of a process 2300 for generating and presenting bundled gifts of a dynamically defined gift object in accordance with at least one embodiment. Components of a gift service such as the gift service 108 described herein at least in connection with FIG. 1 may perform the process 2300 illustrated in FIG. 23.

At step 2302 of the example process 2300, components of the gift service offer a bundled gift selection by, for example, displaying a user interface that allows a user to choose bundled gifts. In an embodiment, the components of the gift service offer the bundled gift selection to a gift purchaser (e.g., the purchaser 102 described herein at least in connection with FIG. 1) using systems and methods such as those described herein. In an embodiment, the components of the gift service offer the bundled gift selection to a gift recipient (e.g., the recipient 114 described herein at least in connection with FIG. 1) also using systems and methods such as those described herein.

At step 2304 of the example process 2300, components of the gift service determine whether the user selected a gift bundle of a bundled gift. If, at step 2304, the components of the gift service determine that the user did not select a gift bundle of a bundled gift (the "NO" branch), the example process continues at step 2314, described in detail below.

If, at step 2304, the components of the gift service determine that the user did select a gift bundle of a bundled gift (the "YES" branch), at step 2306 of the example process 2300, components of the gift service determine the gift types for the bundled gift (e.g., the components of the gift service define the gift options 126 as described herein at least in connection with FIG. 1). At step 2308 of the example process 2300, components of the gift service select the first gift type of the gift types determined at step 2306 (e.g., the first gift type 2102 for the sweater, described herein at least in connection with FIG. 21).

At step 2310 of the example process 2300, components of the gift service present the gift selection options corresponding to different gifts for the gift type selected at step 2308 (e.g., present the gift selection options 128 described herein as described herein at least in connection with FIG. 1) and at step 2310 of the example process 2300, components of the gift service determine whether the user selected one or more gift selections options from the gift selection options presented at step 2310. If at step 2312, the components of the gift service determine that the user did not select any gift selection options from the gift selection options presented at step 2310 (the "NO" branch), the example process continues at step 2314, described in detail below.

If at step 2312, the components of the gift service determine that the user did choose one or more gift selection options from those presented to the user for the particular gift type (the "YES" branch), at step 2316, components of the gift service determine whether there is another gift type to present. In the example illustrated in FIG. 21, the components of the gift service would determine that there is another gift type to present (e.g., the second gift type 2104 for the jeans, described herein at least in connection with FIG. 21).

If, at step 2316, the components of the gift service determine that there is another gift type to present (the "YES" branch), the example process 2300 continues at step 2308, to process the next gift type. If, at step 2316, the components of the gift service determine that there is not another gift type to present (the "NO" branch), at step 2318 components of the gift service send the gifts of the bundled gift to the gift recipient using systems and methods such as those described herein.

At step 2322 of the example process 2300, components of the gift service update the gift object algorithm (e.g., the gift object algorithm 118 described herein at least in connection with FIG. 1) and also update the gift selection algorithm (e.g., the gift selection algorithm 122, also described herein at least in connection with FIG. 1) using systems and methods such as those described herein.

At step 2314 of the example process 2300, components of the gift service determine whether to present new gift bundles to the user. In an embodiment, the components of the gift service may determine whether to present new gift bundles to the user if the user did not select a bundle (e.g., at step 2304). In an embodiment, the components of the gift service may determine whether to present new gift categories to the user if the user did not select a gift for the presented gift type (e.g., at step 2312).

If at step 2314, the components of the gift service determine to present new gift bundles to the user (the "YES"

branch), the example process 2300 may return to step 2302 to offer the new gift bundles. If at step 2314, the components of the gift service determine to not present new gift bundles to the user (the "NO" branch), at step 2320, components of the gift service may present a set of gift alternatives to the user (e.g., a gift card, a refund to the purchaser, a different retailer, an exchange, etc.). The example process 2300 then continues to step 2322 to update the gift object algorithm and the gift selection algorithm, as described herein.

It should be noted that the order of the steps presented in the example process 2300 may be different than the order illustrated. For example, step 2310 (to present the gift selection options for the gift type) may not be performed after step 2308 (within the loop from step 2308 to step 2316) but may instead be performed for all of the gift types after the loop from 2308 to 2316 completes. Similarly, the determination at step 2312 as to whether the user did select a one or more gift selection options may not be evaluated until all of the gift types have been presented (e.g., after step 2316). Consequently, the "NO" branch from step 2312 to step 2314 may not be taken until after step 2316. Additionally, although not illustrated in FIG. 23, steps of the example process 2300 may be performed in parallel and the example process 2300 is may be reentrant in that the process begins at step 2302 after completing step 2322.

Figure 24:
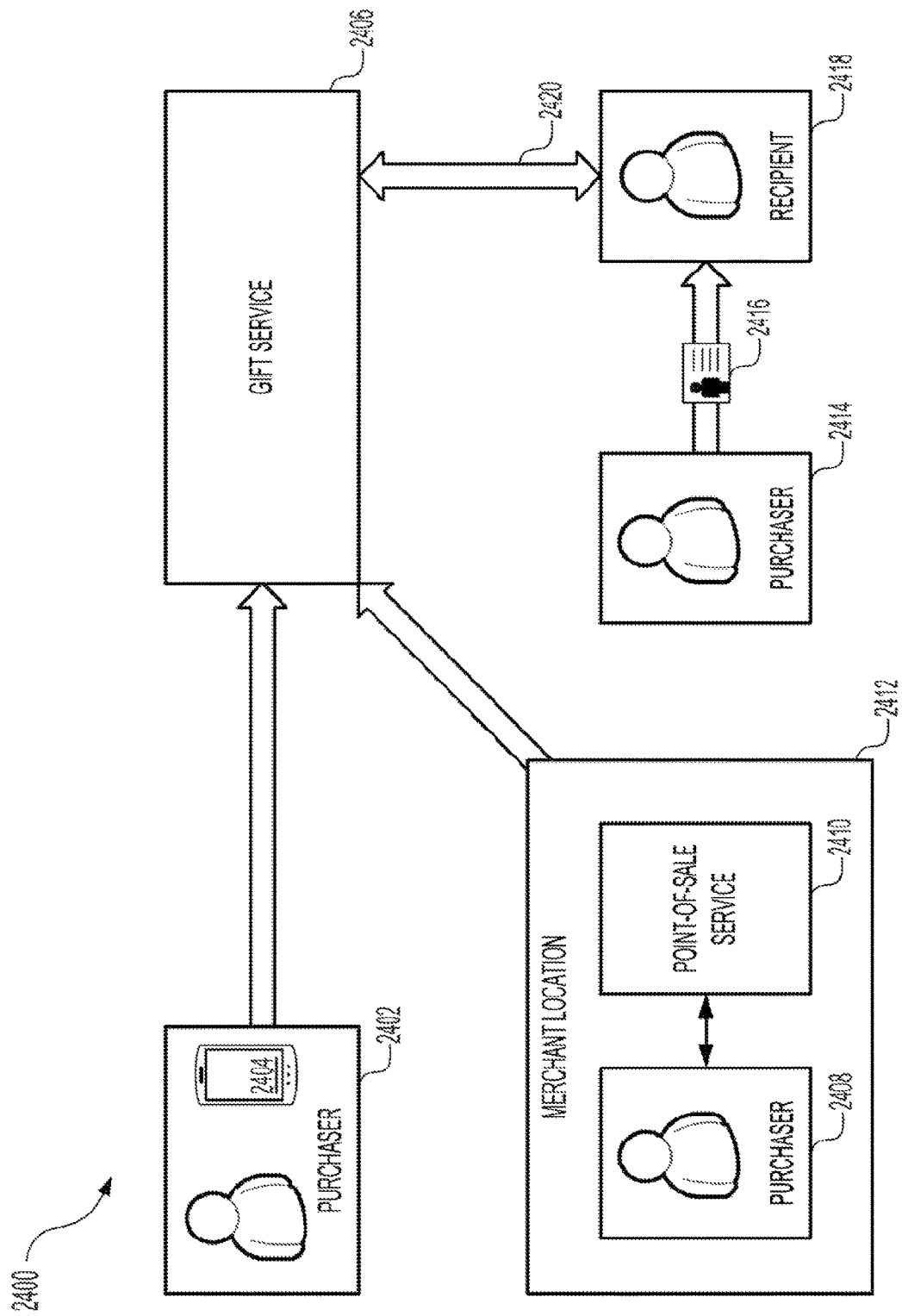
FIG. 24 shows an illustrative example of an environment in which options for initiating a dynamically defined gift object are presented in accordance with at least one embodiment in accordance with at least one embodiment.

FIG. 24 shows an illustrative example of an environment 2400 in which options for initiating a dynamically defined gift object are presented in accordance with at least one embodiment. In an embodiment, a purchaser 2402 initiates the process to send a gift to a recipient (e.g., submits a gift request to a gift service 2406) using an application executing on a computing device 2404 and over a network such as those described herein (e.g., using a computing device such as the computing device 2502 over a network such as the network 2522 as described herein at least in connection with FIG. 25) using systems and methods such as those described herein. In an embodiment, a purchaser 2402 initiates the process to send a gift to a recipient using a website to access a web service provided by the gift service 2406, over a network such as the network 2522, and using systems and methods such as those described herein.

In an embodiment, a purchaser 2408 initiates the process to send a gift to a recipient (e.g., submits a gift request to a gift service 2406) using an application executing using a point-of-sale service 2410 at a merchant location 2412. In an embodiment, the point-of-sale service 2410 is a kiosk located at the merchant location 2412. In an embodiment, the point-of-sale service 2410 is implemented using an application executing on a computing device at the merchant location 2412 (e.g., the merchant computing device 2536 described herein at least in connection with FIG. 25). In an embodiment, the application communicates the gift request to the gift service 2406 over a network such as those described herein. In an embodiment, a purchaser 2408 initiates the process to send a gift to a recipient using a website hosted on the point-of-sale service 2410 and/or hosted on the computing device at the merchant location 2412. In an embodiment, the web service is used to access a web service provided by the gift service 2406, over a network such as the network 2522, and using systems and methods such as those described herein.

In an embodiment, the purchaser 2414 purchases a physical gift card 2416 (which is the same as the physical gift card 2204 described herein at least in connection with FIG. 22) and provides the physical gift card 2416 to the recipient 2418. The recipient 2418 may then use the physical gift card to initiate 2420 the gift process (e.g., submit a gift request to a gift service 2406) using the systems and methods such as those described herein.

FIG. 25 illustrates a computing system architecture 2500, including various components in electrical communication with each other, in accordance with some embodiments. The example computing system architecture 2500 illustrated in FIG. 25 includes a computing device 2502, which has various components in electrical communication with each other using a connection 2506, such as a bus, in accordance with some implementations. The example computing system architecture 2500 includes a processing unit 2504 that is in electrical communication with various system components, using the connection 2506, and including the system memory 2514. In some embodiments, the system memory 2514 includes read-only memory (ROM), random-access memory (RAM), and other such memory technologies including, but not limited to, those described herein. In some embodiments, the example computing system architecture 2500 includes a cache 2508 of high-speed memory connected directly with, in close proximity to, or integrated as part of the processor 2504. The system architecture 2500 can copy data from the memory 2514 and/or the storage device 2510 to the cache 2508 for quick access by the processor 2504. In this way, the cache 2508 can provide a performance boost that decreases or eliminates processor delays in the processor 2504 due to waiting for data. Using modules, methods and services such as those described herein, the processor 2504 can be configured to perform various actions. In some embodiments, the cache 2508 may include multiple types of cache including, for example, level one (L1) and level two (L2) cache. The memory 2514 may be referred to herein as system memory or computer system memory. The memory 2514 may include, at various times, elements of an operating system, one or more applications, data associated with the operating system or the one or more applications, or other such data associated with the computing device 2502.

Other system memory 2514 can be available for use as well. The memory 2514 can include multiple different types of memory with different performance characteristics. The processor 2504 can include any general purpose processor and one or more hardware or software services, such as service 2512 stored in storage device 2510, configured to control the processor 2504 as well as a special-purpose processor where software instructions are incorporated into the actual processor design. The processor 2504 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 2504 can be a microprocessor, a microcontroller, a digital signal processor ("DSP"), or a combination of these and/or other types of processors. In some embodiments, the processor 2504 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 2500, an input device 2516 can represent any number of input mechanisms, such as a microphone for speech, a touch-sensitive screen for gesture or graphical input, keyboard, mouse, motion input, pen, and other such input devices. An output device 2518 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 2500. In some embodiments, the input device 2516 and/or the output device 2518 can be coupled to the computing device 2502 using a remote connection device such as, for example, a communication interface such as the network interface 2520 described herein. In such embodiments, the communication interface can govern and manage the input and output received from the attached input device 2516 and/or output device 2518. As may be contemplated, there is no restriction on operating on any particular hardware arrangement and accordingly the basic features here may easily be substituted for other hardware, software, or firmware arrangements as they are developed.

In some embodiments, the storage device 2510 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described herein, the storage device 2510 can include hardware and/or software services such as service 2512 that can control or configure the processor 2504 to perform one or more functions including, but not limited to, the methods, processes, functions, systems, and services described herein in various embodiments. In some embodiments, the hardware or software services can be implemented as modules. As illustrated in example computing system architecture 2500, the storage device 2510 can be connected to other parts of the computing device 2502 using the system connection 2506. In an embodiment, a hardware service or hardware module such as service 2512, that performs a function can include a software component stored in a non-transitory computer-readable medium that, in connection with the necessary hardware components, such as the processor 2504, connection 2506, cache 2508, storage device 2510, memory 2514, input device 2516, output device 2518, and so forth, can carry out the functions such as those described herein.

The disclosed gift service and the associated systems and methods for dynamically defining gift objects can be performed using a computing system such as the example computing system illustrated in FIG. 25, using one or more components of the example computing system architecture 2500. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems for dynamically defining gift objects described herein by, for example, executing code using a processor such as processor 2504 wherein the code is stored in memory such as memory 2514 as described herein. One or more of a user device, a provider server or system, a database system, or other such devices, services, or systems may include some or all of the components of the computing system such as the example computing system illustrated in FIG. 25, using one or more components of the example computing system architecture 2500 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 2528. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 2504 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 2514 can be coupled to the processor 2504 by, for example, a connector such as connector 2506, or a bus. As used herein, a connector or bus such as connector 2506 is a communications system that transfers data between components within the computing device 2502 and may, in some embodiments, be used to transfer data between computing devices. The connector 2506 can be a data bus, a memory bus, a system bus, or other such data transfer mechanism. Examples of such connectors include, but are not limited to, an industry standard architecture (ISA bus, an extended ISA (EISA) bus, a parallel AT attachment (PATA bus (e.g., an integrated drive electronics (IDE) or an extended IDE (EIDE) bus), or the various types of parallel component interconnect (PCI) buses (e.g., PCI, PCIe, PCI-104, etc.).

The memory 2514 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 2514 can also include magnetic or optical data storage media including read-only (e.g., CD ROM and DVD ROM) or otherwise (e.g., CD or DVD). The memory can be local, remote, or distributed.

As described herein, the connector 2506 (or bus) can also couple the processor 2504 to the storage device 2510, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 2510. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 2506 can also couple the processor 2504 to a network interface device such as the network interface 2520. The interface can include one or more of a modem or other such network interfaces including, but not limited to those described herein. It will be appreciated that the network interface 2520 may be considered to be part of the computing device 2502 or may be separate from the computing device 2502. The network interface 2520 can include one or more of an analog modem, Integrated Services Digital Network (ISDN) modem, cable modem, token ring interface, satellite transmission interface, or other interfaces for coupling a computer system to other computer systems. In some embodiments, the network interface 2520 can include one or more input and/or output (I/O) devices. The I/O devices can include, by way of example but not limitation, input devices such as input device 2516 and/or output devices such as output device 2518. For example, the network interface 2520 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™, SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 2502 can be connected to one or more additional computing devices such as computing device 2524 via a network 2522 using a connection such as the network interface 2520. In such embodiments, the computing device 2524 may execute one or more services 2526 to perform one or more functions under the control of, or on behalf of, programs and/or services operating on computing device 2502. In some embodiments, a computing device such as computing device 2524 may include one or more of the types of components as described in connection with computing device 2502 including, but not limited to, a processor such as processor 2504, a connection such as connection 2506, a cache such as cache 2508, a storage device such as storage device 2510, memory such as memory 2514, an input device such as input device 2516, and an output device such as output device 2518. In such embodiments, the computing device 2524 can carry out the functions such as those described herein in connection with computing device 2502. In some embodiments, the computing device 2502 can be connected to a plurality of computing devices such as computing device 2524, each of which may also be connected to a plurality of computing devices such as computing device 2524. Such an embodiment may be referred to herein as a distributed computing environment.

The network 2522 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 2522 can be wired connections, wireless connections, or combinations thereof. Communications via the network 2522 can be made via a variety of communications protocols including, but not limited to, Transmission Control Protocol/Internet Protocol (TCP/IP), User Datagram Protocol (UDP), protocols in various layers of the Open System Interconnection (OSI)

model, File Transfer Protocol (FTP), Universal Plug and Play (UPnP), Network File System (NFS), Server Message Block (SMB), Common Internet File System (CIFS), and other such communications protocols.

Communications over the network 2522, within the computing device 2502, within the computing device 2524, or within the computing resources provider 2528 can include information, which also may be referred to herein as content. The information may include text, graphics, audio, video, haptics, and/or any other information that can be provided to a user of the computing device such as the computing device 2502. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 2502 and presented to a user of the computing device 2502 using forms that are perceptible via sight, sound, smell, taste, touch, or other such mechanisms. In some embodiments, communications over the network 2522 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 2502 and/or the computing device 2524 can be connected to a computing resources provider 2528 via the network 2522 using a network interface such as those described herein (e.g. network interface 2520). In such embodiments, one or more systems (e.g., service 2530 and service 2532) hosted within the computing resources provider 2528 (also referred to herein as within "a computing resources provider environment") may execute one or more services to perform one or more functions under the control of, or on behalf of, programs and/or services operating on computing device 2502 and/or computing device 2524. Systems such as service 2530 and service 2532 may include one or more computing devices such as those described herein to execute computer code to perform the one or more functions under the control of, or on behalf of, programs and/or services operating on computing device 2502 and/or computing device 2524.

For example, the computing resources provider 2528 may provide a service, operating on service 2530 to store data for the computing device 2502 when, for example, the amount of data that the computing device 2502 exceeds the capacity of storage device 2510. In another example, the computing resources provider 2528 may provide a service to first instantiate a virtual machine (VM) on service 2532, use that VM to access the data stored on service 2532, perform one or more operations on that data, and provide a result of those one or more operations to the computing device 2502. Such operations (e.g., data storage and VM instantiation) may be referred to herein as operating "in the cloud," "within a cloud computing environment," or "within a hosted virtual machine environment," and the computing resources provider 2528 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 2528 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not limited to, virtual machines, virtual storage, database services, system schedulers (e.g., hypervisors), resource management systems, various types of short-term, mid-term, long-term, and archival storage devices, etc.

As may be contemplated, the systems such as service 2530 and service 2532 may implement versions of various services (e.g., the service 2512 or the service 2526) on behalf of, or under the control of, computing device 2502 and/or computing device 2524. Such implemented versions of various services may involve one or more virtualization techniques so that, for example, it may appear to a user of computing device 2502 that the service 2512 is executing on the computing device 2502 when the service is executing on, for example, service 2530. As may also be contemplated, the various services operating within the computing resources provider 2528 environment may be distributed among various systems within the environment as well as partially distributed onto computing device 2524 and/or computing device 2502.

In an embodiment, the computing device 2502 can be connected to one or more additional computing devices and/or services such as merchant computing device 2536 and/or a point-of-sale service 2534 via the network 2522 and using a connection such as the network interface 2520. In an embodiment, the point-of-sale service 2534 is separate from the merchant computing device 2536. In an embodiment, the point-of-sale service 2534 is executing on the merchant computing device 2536. In an embodiment, the point-of-sale service 2534 is executing as one or more services (e.g., the service 2530 and/or the service 2532) operating within the environment of the computing resources provider. As used herein, a point-of-sale service 2534 is a service used by one or more merchants to manage sales transactions for customers, to process payment transactions for customers (e.g., credit card transactions), to manage inventory for merchants, to identify customers based on, for example, customer loyalty programs, and other such tasks.

In an embodiment, a customer and/or a merchant uses the merchant computing device 2536 to interact with the point-of-sale service 2534. In an embodiment, the merchant computing device 2536 is a dedicated point-of-service (POS) terminal. In an embodiment, the merchant computing device 2536 is a cash register system. In an embodiment, the merchant computing device 2536 is an application or web service operating on a computing device such as the computing device 2502 described herein. In such an embodiment, the application or web service may be provided by a financial services system (e.g., a bank, a transaction processing system, an inventory management system, or some other such financial services system). In an embodiment, the merchant computing device 2536 includes an auxiliary device or system to execute tasks associated with the point-of-sale service 2534 (e.g., a credit card processing device attached to a smart phone or tablet). In an embodiment, the merchant computing device 2536 is a kiosk that is located at a merchant location (e.g., in a merchant's "brick and mortar" store), in a high traffic area (e.g., in a mall or in an airport concourse), or at some other such location. In such an embodiment, the kiosk may include additional branding elements to allow associating the kiosk with a vendor. In an embodiment, the merchant computing device 2536 is a virtual device (e.g., a virtual kiosk) such as the virtual devices described herein. Although not illustrated here, in an embodiment, the merchant computing device 2536 may be one of a plurality of devices that may be interconnected using a network such as the network 2522.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 2502) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described herein. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the process 500 for defining gift objects illustrated in FIG. 5). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 2502.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described herein. The elements and acts of the various examples described herein can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described herein to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described herein may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
   receiving a gift request, wherein the gift request is received through real-time communications exchanged between a purchaser and a gift service, and wherein the gift request is associated with a gift recipient profile and a purchaser intent;
   generating in real-time a computational model corresponding to the purchaser intent, wherein the computational model is generated in real-time as the real-time communications are exchanged;
   identifying a gift object type, wherein the gift object type is identified based on the computational model;
   dynamically training a gift object algorithm to generate gift objects based on one or more vectors, wherein the gift object algorithm is dynamically trained using a dataset, and wherein the dataset includes different purchaser intents and gift object types;
   generating a set of clusters from the dataset, wherein the set of clusters are generated according to one or more vectors;
   dynamically identifying a cluster from the set of clusters based on the computational model and the gift recipient profile, wherein the cluster is identified by the gift object algorithm according to one or more partial matches along the one or more vectors;
   generating a gift object, wherein the gift object is generated based on the cluster and the gift object type, and wherein the gift object is generated with an undefined set of gift selection options;
   providing the gift object, wherein in response to the gift object being received, a redemption request associated with the gift object is generated;
   dynamically training a gift selection algorithm to generate custom sets of gift selection options for different gift objects, wherein the gift selection algorithm is dynamically trained using a set of sample gift objects, sample gift selection options generated based on the set of sample gift objects, and sample gift selections from the set of sample gift objects;
   dynamically identifying a custom set of gift selection options based on the gift object and the redemption request, wherein the custom set of gift selection options are dynamically identified by the gift selection algorithm;
   receiving a selection of a gift selection option from the custom set of gift selection options; and
   updating the gift object algorithm and the gift selection algorithm using the redemption request, the selection, and the custom set of gift selection options.

2. The computer-implemented method of claim 1, wherein the gift object type corresponds to a bundled gift, wherein the gift object includes a set of gift types associated with the bundled gift, and wherein a particular gift selection option associated with the custom set of gift selection options is dynamically identified based on a gift type associated with the set of gift types.

3. The computer-implemented method of claim 1, wherein the gift object type corresponds to a category gift, wherein the gift object includes a gift category associated with the category gift, and wherein a particular gift selection option associated with the custom set of gift selection options is dynamically identified based on the gift category.

4. The computer-implemented method of claim 1, wherein the gift selection option corresponds to a request to exchange a gift associated with the gift object.

5. The computer-implemented method of claim 1, wherein the gift selection option corresponds to a request for a gift card, and wherein the request for the gift card corresponds to a gift object value associated with the gift object.

6. The computer-implemented method of claim 1, wherein the custom set of gift selection options is generated by the gift selection algorithm according to a gift availability corresponding to a set of gifts, and wherein the gift availability is determined in response to the redemption request.

7. The computer-implemented method of claim 1, further comprising:
   dynamically generating a custom set of backup gift selection options for the gift object in response to the redemption request, wherein the custom set of backup gift selection options are generated by the gift selection algorithm; and updating the gift object algorithm and the gift selection algorithm using the custom set of backup gift selection options.

8. A system, comprising:

one or more processors; and memory storing thereon instructions that, as a result of being executed by the one or more processors, cause the system to:
- receive a gift request, wherein the gift request is received through real-time communications exchanged between a purchaser and a gift service, and wherein the gift request is associated with a gift recipient profile and a purchaser intent;
- generate in real-time a computational model corresponding to the purchaser intent, wherein the computational model is generated in real-time as the real-time communications are exchanged;
- identify a gift object type, wherein the gift object type is identified based on the computational model;
- dynamically train a gift object algorithm to generate gift objects based on one or more vectors, wherein the gift object algorithm is dynamically trained using a dataset, and wherein the dataset includes different purchaser intents and gift object types;
- generate a set of clusters from the dataset, wherein the set of clusters are generated according to one or more vectors;
- dynamically identifying a cluster from the set of clusters based on the computational model and the gift recipient profile, wherein the cluster is identified by the gift object algorithm according to one or more partial matches along the one or more vectors;
- generate a gift object, wherein the gift object is generated based on the cluster and the gift object type, and wherein the gift object is generated with an undefined set of gift selection options;
- provide the gift object, wherein in response to the gift object being received, a redemption request associated with the gift object is generated;
- dynamically train a gift selection algorithm to generate custom sets of gift selection options for gift objects, wherein the gift selection algorithm is dynamically trained using a set of sample gift objects, sample gift selection options generated based on the set of sample gift objects, and sample gift selections from the set of sample gift objects;
- dynamically identify a custom set of gift selection options based on the gift object and the redemption request, wherein the custom set of gift selection options are dynamically identified by the gift selection algorithm;
- receive a selection of a gift selection option from the custom set of gift selection options; and
- update the gift object algorithm and the gift selection algorithm using the redemption request, the selection, and the custom set of gift selection options.

9. The system of claim 8, wherein the gift object type corresponds to a bundled gift, wherein the gift object includes a plurality of gift types associated with the bundled gift, and wherein a particular gift selection option associated with the custom set of gift selection options is dynamically identified based on a gift type of the plurality of gift types.

10. The system of claim 8, wherein the gift object type corresponds to a category gift, wherein the gift object includes a gift category associated with the category gift, and wherein a particular gift selection option associated with the custom set of gift selection options is dynamically identified based on the gift category.

11. The system of claim 8, wherein the gift selection option corresponds to a request to exchange a gift associated with the gift object.

12. The system of claim 8, wherein the gift selection option corresponds to a request for a gift card, and wherein the request for the gift card corresponds to a gift object value associated with the gift object.

13. The system of claim 8, wherein the custom set of gift selection options is generated by the gift selection algorithm according to a gift availability corresponding to a set of gifts, and wherein the gift availability is determined in response to the redemption request.

14. The system of claim 8, wherein the instructions further cause the system to:
- dynamically generate a custom set of backup gift selection options for the gift object in response to the redemption request, wherein the custom set of backup gift selection options are generated by the gift selection algorithm; and
- update the gift object algorithm and the gift selection algorithm using the custom set of backup gift selection options.

15. A non-transitory, computer-readable storage medium storing thereon executable instructions that, as a result of being executed by a computer system, cause the computer system to:
- receive a gift request, wherein the gift request is received through real-time communications exchanged between a purchaser and a gift service, and wherein the gift request is associated with a gift recipient profile and a purchaser intent;
- generate in real-time a computational model corresponding to the purchaser intent, wherein the computational model is generated in real-time as the real-time communications are exchanged;
- identify a gift object type, wherein the gift object type is identified based on the computational model;
- dynamically train a gift object algorithm to generate gift objects based on one or more vectors, wherein the gift object algorithm is dynamically trained using a dataset, and wherein the dataset includes different purchaser intents and gift object types;
- generate a set of clusters from the dataset, wherein the set of clusters are generated according to one or more vectors;
- dynamically identifying a cluster from the set of clusters based on the computational model and the gift recipient profile, wherein the cluster is identified by the gift object algorithm according to one or more partial matches along the one or more vectors;
- generate a gift object, wherein the gift object is generated based on the cluster and the gift object type, and wherein the gift object is generated with an undefined set of gift selection options;
- provide the gift object, wherein in response to the gift object being received, a redemption request associated with the gift object is generated;
- dynamically train a gift selection algorithm to generate custom sets of gift selection options for different gift objects, wherein the gift selection algorithm is dynamically trained using a set of sample gift objects, sample gift selection options generated based on the set of sample gift objects, and sample gift selections from the set of sample gift objects;

dynamically identify a custom set of gift selection options based on the gift object and the redemption request, wherein the custom set of gift selection options are dynamically identified by the gift selection algorithm;

receive a selection of a gift selection option from the custom set of gift selection options; and update the gift object algorithm and the gift selection algorithm using the redemption request, the selection, and the custom set of gift selection options.

16. The non-transitory, computer-readable storage medium of claim 15, wherein the gift object type corresponds to a bundled gift, wherein the gift object includes a set of gift types associated with the bundled gift, and wherein a particular gift selection option associated with the custom set of gift selection options is dynamically identified based on a gift type associated with the set of gift types.

17. The non-transitory, computer-readable storage medium of claim 15, wherein the gift object type corresponds to a category gift, wherein the gift object includes a gift category associated with the category gift, and wherein a particular gift selection option associated with the custom set of gift selection options is dynamically identified based on the gift category.

18. The non-transitory, computer-readable storage medium of claim 15, wherein the gift selection option corresponds to a request to exchange a gift associated with the gift object.

19. The non-transitory, computer-readable storage medium of claim 15, wherein the gift selection option corresponds to a request for a gift card, and wherein the request for the gift card corresponds to a gift object value associated with the gift object.

20. The non-transitory, computer-readable storage medium of claim 15, wherein the custom set of gift selection options is generated by the gift selection algorithm according to a gift availability corresponding to a set of gifts, and wherein the gift availability is determined in response to the redemption request.

21. The non-transitory, computer-readable storage medium of claim 15, wherein the executable instructions cause the computer system to:

dynamically generate a custom set of backup gift selection options for the gift object in response to the redemption request, wherein the custom set of backup gift selection options are generated by the gift selection algorithm; and update the gift object algorithm and the gift selection algorithm using the custom set of backup gift selection options.

\* \* \* \* \*